US009996441B2

(12) United States Patent
Patzer et al.

(10) Patent No.: US 9,996,441 B2
(45) Date of Patent: Jun. 12, 2018

(54) SYSTEM AND METHOD FOR BUILDING A SCRIPT FOR A WEB PAGE USING AN EXISTING SCRIPT FROM A SIMILAR WEB PAGE

(71) Applicant: INTUIT INC., Mountain View, CA (US)

(72) Inventors: Aaron Patzer, Mountain View, CA (US); Jean Sini, Mountain View, CA (US)

(73) Assignee: INTUIT INC., Mountain View, CA (US)

(*) Notice: Subject to any disclaimer, the term of this patent is extended or adjusted under 35 U.S.C. 154(b) by 0 days. days.

(21) Appl. No.: 15/692,219

(22) Filed: Aug. 31, 2017

(65) Prior Publication Data

US 2018/0067833 A1     Mar. 8, 2018

Related U.S. Application Data

(63) Continuation of application No. 13/473,488, filed on May 16, 2012, now Pat. No. 9,779,007.

(60) Provisional application No. 61/519,132, filed on May 16, 2011.

(51) Int. Cl.
| | |
|---|---|
| *H03M 5/00* | (2006.01) |
| *H03M 7/00* | (2006.01) |
| *G06F 11/34* | (2006.01) |
| *G06F 17/22* | (2006.01) |
| *G06F 17/24* | (2006.01) |
| *G06F 17/30* | (2006.01) |

(52) U.S. Cl.
CPC ...... *G06F 11/3409* (2013.01); *G06F 17/2247* (2013.01); *G06F 17/2258* (2013.01); *G06F 17/30* (2013.01); *G06F 17/30861* (2013.01); *G06F 11/3414* (2013.01); *G06F 17/2288* (2013.01); *G06F 17/24* (2013.01); *G06F 17/3089* (2013.01); *G06F 17/30864* (2013.01); *G06F 17/30867* (2013.01); *G06F 17/30873* (2013.01); *G06F 17/30876* (2013.01)

(58) Field of Classification Search
CPC .. G06F 17/30; G06F 11/3409; G06F 17/2247; G06F 17/2258; G06F 17/30861; G06F 17/30867; H03M 5/00; H03M 7/00; H04L 67/02; H04L 63/0227; H04L 2209/60
USPC ........................................................ 715/234
See application file for complete search history.

(56) References Cited

U.S. PATENT DOCUMENTS

2008/0162449 A1* 7/2008 Chao-Yu ................ G06F 21/51
2008/0288476 A1* 11/2008 Kim ................. G06F 17/30905

* cited by examiner

*Primary Examiner* — Cesar Paula
*Assistant Examiner* — Luu-Phuong Nguyen
(74) *Attorney, Agent, or Firm* — Patterson & Sheridan LLP

(57) ABSTRACT

A system and method allows users to provide portions of scripts or scripts for retrieval of information from one or more web sites of one or more businesses by demonstrating operation of the one or more web sites and identifying locations of one or more fields on each web page of the one or more web sites, and the system and method stores the scripts and uses the scripts to retrieve information from such web site or web sites for any number of users. Different portions of different scripts may be used as a single script to retrieve information from a single web site. Scripts or portions of scripts may be repaired using information from previously working scripts or portions, the web site when the script or portion worked, and the web site when the script or portion did not work.

20 Claims, 6 Drawing Sheets

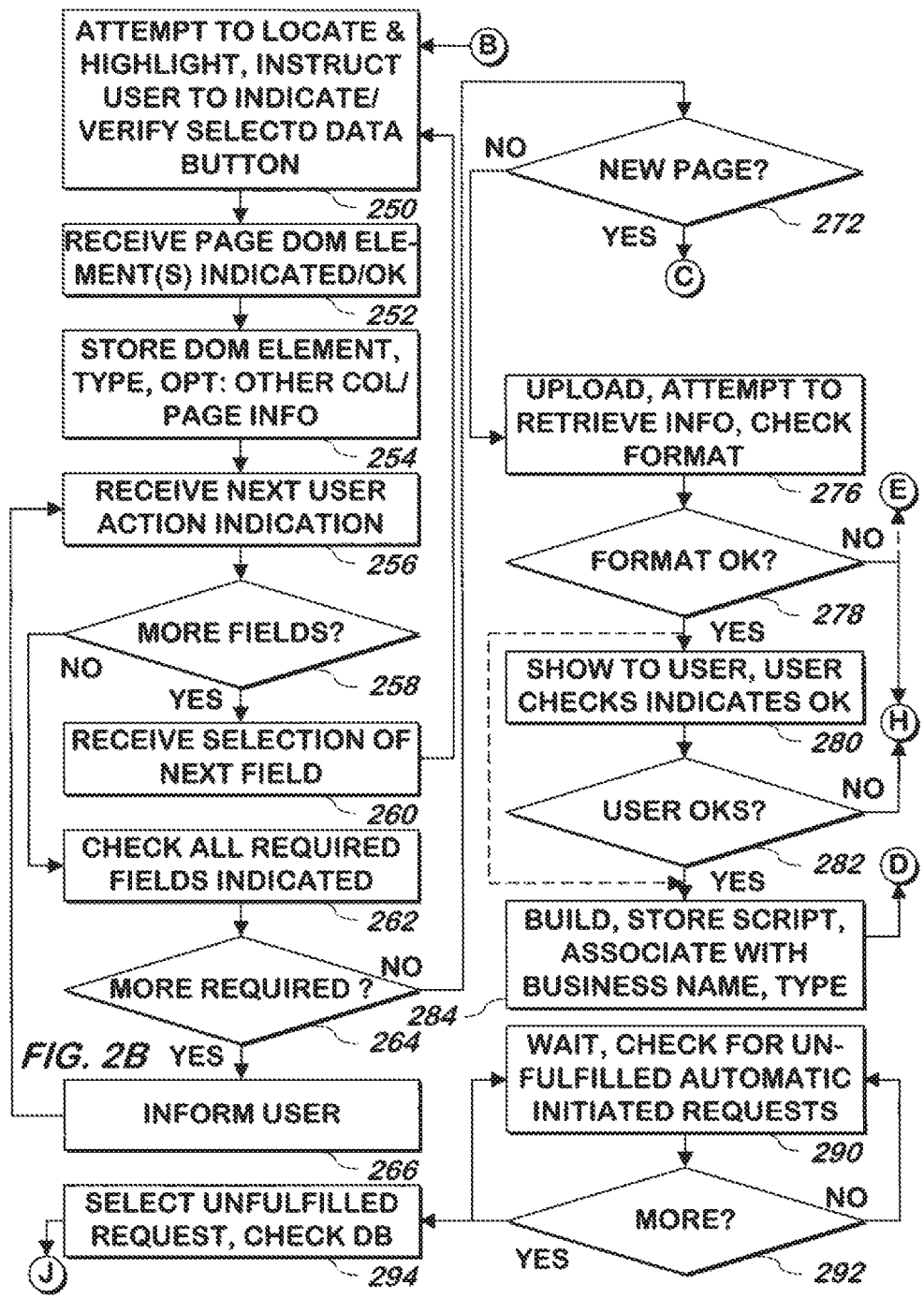

SYSTEM AND METHOD FOR BUILDING A SCRIPT FOR A WEB PAGE USING AN EXISTING SCRIPT FROM A SIMILAR WEB PAGE

RELATED APPLICATIONS

This application is a continuation of U.S. patent application Ser. No. 13/473,488 entitled "System and Method for Automated Web Site Information Retrieval Scripting Using Untrained Users," which was filed on May 16, 2012 and claims the benefit of U.S. Provisional Patent Application 61/519,132 entitled "System and Method for Automated Web Site Information Retrieval Scripting Using Untrained Users" filed on May 16, 2011 and is related to U.S. patent application Ser. No. 13/473,464 entitled, "System and Method for Automated Web Site Information Retrieval Scripting Using Untrained Users" filed on May 16, 2012 and abandoned on Dec. 23, 2016 and U.S. patent application Ser. No. 13/473,478 entitled, "System and Method for Automated Web Site Information Retrieval Scripting Using Untrained Users" filed on May 16, 2012 and issued as U.S. Pat. No. 8,706,762 on Apr. 22, 2014, each having the same assignee as the present application and each is hereby incorporated by reference in its entirety.

FIELD OF THE INVENTION

The present invention is related to computer software and more specifically to computer software for web site information retrieval.

BACKGROUND OF THE INVENTION

Computer software for automated retrieval of information from web sites involves a programmer who writes a script for each web site from which it is desirable to retrieve information. One problem with this approach is that the party writing the script is typically not the party operating the web site from which the information is being retrieved. If the owner of the web site changes the layout of that web site, the script that retrieves information from that web site may no longer work properly.

If information retrieval from a large number of web sites is desired, the aforementioned problem can add significant ongoing expense.

Additionally, the users of the information to be retrieved can become frustrated with the information to be retrieved being unavailable when the script to retrieve it stops working properly. If many web sites are changed around the same time, the programmers required to change the scripts may get backlogged, forcing the users of the information to be retrieved to wait longer and longer for updated information to be retrieved from the web site or sites in which they are interested. The delays involved can cause the users to feel the information is too out of date and unreliable to be useful, causing them to stop using it altogether.

There is also a tension that can arise with teams of programmers writing scripts. The business retrieving the information may find it difficult to justify the cost of writing a script to retrieve information from web sites in which only few users are interested. However, if users cannot obtain the information they need from any source that has it, they may find the subset of information that can get not sufficiently complete to justify the use of any of it. Thus, an entity that retrieves the information is either forced to devote an inordinate amount of resources writing scripts for web sites in which only a small number of users are interested, or the entity may find the market for its information services severely limited, because, if the number of users is large, there may be a vast number of little used web sites, each of which could interest at least some of the entity's potential users.

What is needed is a system and method that can allow information to be retrieved cost effectively, even from little used web sites, and can provide for scripts for information retrieval to be reliably updated faster than the team of employed programmers available to update such scripts may be able to implement such updates, can assemble an updated script that works for a given web site from portions of several scripts that may have been received from different users, and can help users provide information useful for building scripts or portions of scripts to allow such user to provide such information quickly and/or easily.

SUMMARY OF INVENTION

A system and method receives a business name or web site address from a user desiring to have information retrieved from that business or web site, and optionally the user name and password the user would use to manually retrieve information from the business. A determination is made as to whether a script exists for that business that has been successful in retrieving information from that web site or business. Such a script may actually be elements of different scripts that were received from different users that, when used together, can retrieve information from the web site or web site of the business name supplied by the user.

If such a script exists, information retrieval is attempted using the script, and the success or failure of the script to retrieve such information is recorded. The use of elements from different scripts allows information retrieval to be performed in a manner that none of the individual scripts from which the elements were retrieved would have been able to perform without the use of elements from at least one other script.

If no such script exists or the information retrieval is unsuccessful, that user or a different user may be asked whether the user would like to show a computer program how such information is retrieved by demonstrating operation of the web site for the business. If so, a plug in to the user's browser is downloaded and installed or the user is redirected to a web page on a server such as a proxy server that retrieves pages from the web site of the business, alters them as the plug in would, and provides them to the user's browser.

The plug in (or a proxy server) causes the user's browser to display a web page specified by the user or otherwise provided to it, and the names of various types of pages that may be encountered when retrieving information from a web site, and the plug in (or proxy server) requests the user to indicate which type of page to which the user has navigated.

When the user indicates the type of page, the system and method, records the URL which the user specified, and displays the types of information and/or user interface controls (referred to as "fields") that may be on that type of page and are necessary or useful to, at least ultimately, retrieve information from the web site. For example, a field may be a single piece of information to be retrieved, a column of information to be retrieved, or a user interface control such as a text box, link or button to be filled in or operated.

The user is instructed to indicate a field and its location on the page. In one embodiment, information on the page that could correspond to a type of information to be indicated by the user is instrumented by the plug in on the server so that the user's browser will highlight each column, piece of information, or other user interface control that could correspond to the most recently selected type as the mouse cursor is above or very near such information and, if the user clicks the mouse while such information is highlighted, to report the information highlighted to the system and method. The user may then repeat the process for a different field on the same page, including using a user interface control on the page to navigate (or navigate directly or inform the server to navigate directly) to the next page the user would use in the process of manually retrieving information from the web site and repeat the process described above until the locations of all fields on each page required or useful to, at least ultimately, retrieve information from the web site have been indicated.

In one embodiment, the location of some or all of the fields (including input fields, data or buttons) on a page may be automatically identified, at least initially, without user input, by the user demonstrating operation of the Web site as described herein, for example, based on an expected arrangement of the fields on a page, labels of fields and so on, and the user is either asked to confirm the location (in which case the field is treated the same as if the user had identified its location) or reject the location and select a different location for the field on the page. The location of some fields may be based entirely automatically, treating the located fields the same as those that the user selected, without any confirmation by the user.

As the user indicates the location of such fields or pages, the location of the fields or page is stored, associated with the type of page, type of information (i.e. a name of a field), and the company name, URL or both. Such stored data acts as a type of script that may be used to retrieve information from the web site.

Scripts may be used in their entirety to retrieve information or different parts (referred to as "elements") of different scripts may be used to retrieve information from a single web site for the same user described above or other users. As a script, or script element is used to retrieve data, its success at achieving the function or functions performed by that script or element is identified and recorded. Scripts or elements that have a high recent success rate are used in preference to other scripts or elements for the same web site that have a low success rate. If the success rate of all scripts, or all script elements that perform a function, for a business falls below a threshold recent success rate, a user who has or will use the information retrieved using the script is requested to provide a new script, or a new script element for the business or web site, to replace any script or script elements for which the success rate of the most successful script or element that performs the same function has fallen below the threshold.

In one embodiment, the system and method may attempt to repair a script or script element or a portion thereof that does not produce a successful result, for example, by attempting to locate a column or other field that has moved, by trying to find a column on the same page with the same name or a synonym name as the one that had been used to successfully retrieve data in the past. A user who will use the information retrieved by the repaired script may be requested to verify the repaired script works correctly.

In one embodiment, the system and method may attempt to identify whether a repaired script or element appears to be working correctly. If so, the user is asked to verify that the repaired script or element is operating correctly, and if not, the user may be asked to provide a new script or script element to replace the script or element that is no longer working correctly. Thus, an attempt may be made to repair a script or element, and the system and method may attempt to verify that the script repair or element repair has worked. If the script or element cannot be repaired or the repair does not appear to be working correctly, the system and method may then ask the user to help build a new script or element as described above. However, if the script or element appears to have been successfully repaired, the user may be asked to verify the repair, which may be an easier process for some users than performing the steps required to build a new script or element.

BRIEF DESCRIPTION OF THE DRAWINGS

FIGS. 2A and 2B are flowcharts illustrating a method of receiving and using information for automatically retrieving information from a web site according to one embodiment of the present invention.

DETAILED DESCRIPTION OF A PREFERRED EMBODIMENT

Figure 1:
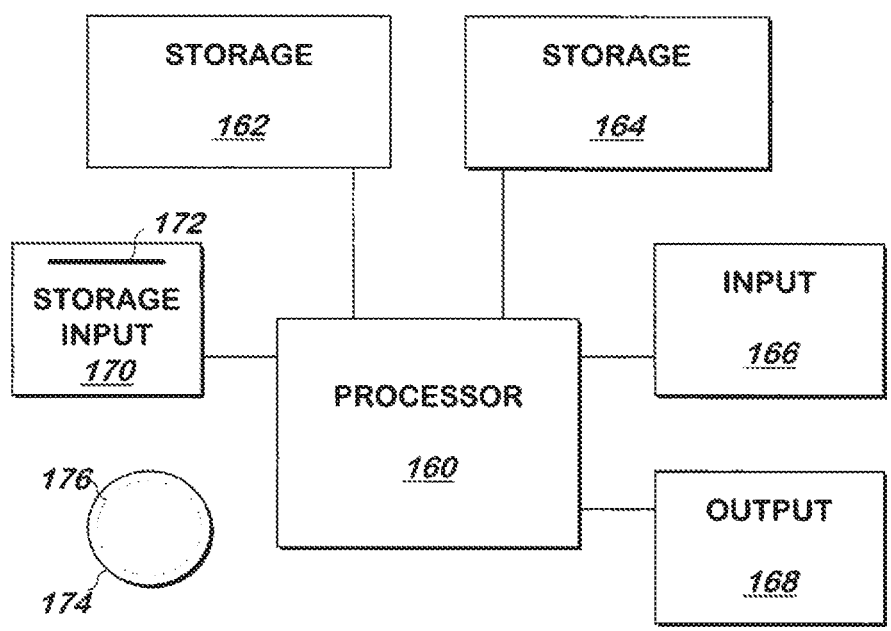
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CDROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS T SERIES SERVER running the SO LARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as XP, VISTA or 7) commercially available from MICROSOFT Corporation of Redmond Wash. or a Macintosh computer system running the MACOS or OPENSTEP operating system commercially available from APPLE INCORPORATED of Cupertino, Calif. and the FIREFOX browser commercially available from MOZILLA FOUNDATION of Mountain View, Calif. or INTERNET EXPLORER browser commercially available from MICROSOFT above, or a conventional cellular telephone running a browser, such as the DROID 3 commercially available from MOTOROLA Corporation of Schaumberg, Ill. running the ANDROID Operating system commercially available from GOOGLE, INC. of Mountain View, Calif. although other systems may be used.

Received Request for Information, Check for Scripts.

Figure 2A:
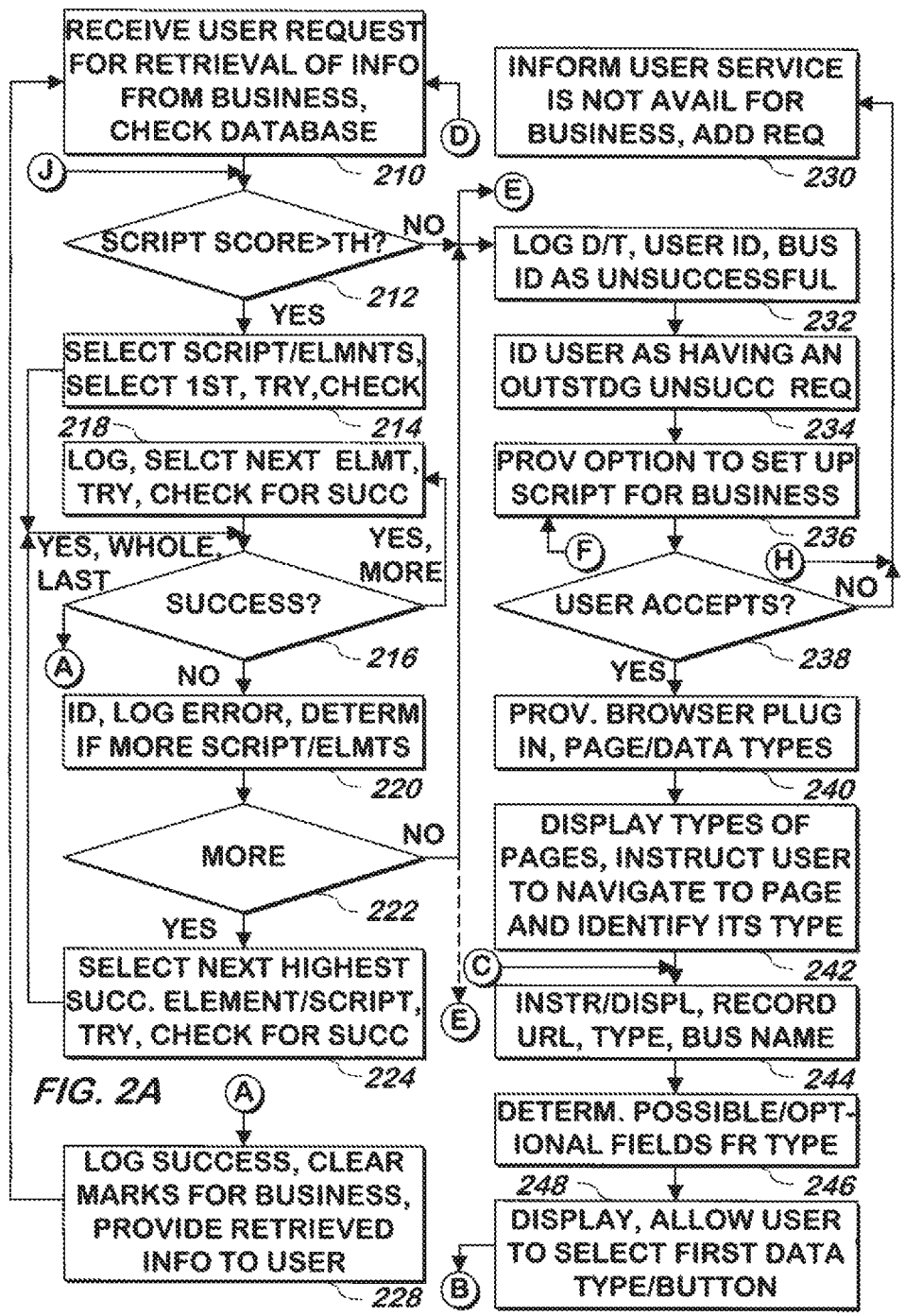

Referring to FIG. 2A, a request for information is received at step 210 from a user of a service that provides information retrieved from the web sites of multiple businesses that are unrelated to the provider of the service. In one embodiment, the request is a request for information from a business that is independent from (e.g. not controlled by, or under control of) the business running the service. The request may be part of a joint request of information from other businesses as well. The request may be a direct request from the user, or the request may have been set up at an earlier time by the user, for example, as part of a standing request to periodically retrieve information from the business. The request may be a request on behalf of a single user or it may be on behalf of multiple users. In one embodiment, the request contains an identifier of the business, such as the name of the business or a URL of a web site operated for that business from which information may be retrieved.

Some Background Information Regarding Scripts and Scores.

As described in more detail herein, zero, one or more scripts may be stored for each identifier of each business. Some or all of the scripts are at least initially programmed by ordinary users as described below. As used herein, a "script" may contain a set of one or more instructions, or may not contain any instructions, but may contain information that can be used by a set of instructions to retrieve information from a web site of the business. For example, a script may be an ordered list of URLs, and Document Object Model identifiers/field name pairs or it may include such information with part of a set of commands that may be used to retrieve information from a web site by using such information and the commands.

To retrieve information from a web site using the script, a URL is used to navigate to a web page (thereby downloading the web page), and then the document object model identifiers and field names of a pair are used in the order specified in the script to either provide information to the web site or retrieve information from the web site. The information to be provided to the web site or retrieved from the web site (e.g. transaction information such as date and time, amount, and a description), and whether information is to be provided or retrieved, is associated with the field name and such provision or retrieval is performed for each Document Object Model/field name pair, as are navigation elements such as links or buttons to be simulated as being clicked. For example, the field name "userid" may be part of a document object model identifier text box(1), and when a script is used to retrieve information on behalf of a user, that user's user identifier for the web site from which information is being retrieved is supplied to the text box with the DOM identifier "textbox(I) on the page navigated to using URL on the script that was nearest to, and preceded the document object model/field name pair. A field name "button press" may be associated with the document object model identifier of a submit button on the page, in the script after the userid field name, and the information for the button is used to submit the information provided back to the server of the web page. The order of information in the script is used to provide or retrieve information or simulate a clock in the same order. The field name "transaction amounts" may be associated with the document object model identifier of a column of data in a table that is on a different page that is received as a result of the button press, and the corresponding column on such resulting page may be retrieved as transaction amounts for that user. Other fields may be used in a similar manner. A field may also correspond to a link, and the URL for any such link may be used as described above as it is encountered in a script.

An ordinary user is a user who is not employed by the service that performs the retrieval of information and optionally is not employed by the company from which the information will be retrieved. As described herein, ordinary users supply information for, or confirm operation of, some or all scripts.

In one embodiment, each script may be used to perform multiple functions. In one embodiment, a script consists of different elements, each element performing a different function. Functions may include logging in, navigating to a web page that supplies the information to be retrieved and retrieving the information, though the script may be used to perform other functions.

In one embodiment, each script is used in its entirety to attempt to retrieve data from a web site, and in another embodiment, individual elements from different scripts supplied for the same web site or business may be combined to retrieve data from a web site or business.

As described in more detail below, each script or each element of a script is assigned an initial score, and then each time the script is used, the score may be modified based on whether the script was successful in retrieving the type of data for which it was supplied. An element may be modified based on whether the function to which the element corresponds operates correctly or apparently correctly.

Although scripts may be used frequently in one embodiment so that they will be discovered to be inoperable very rapidly in the event that the web site changes its manner of operation, in one embodiment, the score is adjusted downward if it has not been used recently or supplied recently so that more recently supplied or recently used scripts or elements may be used in preference to scripts used or supplied (or both) less recently. The score may be assigned to a script, in the embodiment in which scripts are only used in their entirety, or a score may be assigned to each element of each script in the embodiment in which script elements may be used from different scripts to retrieve data as described below.

Check Database for Scripts or Elements Having at Least a Threshold Score.

A database is checked as part of step 210 to determine if a script, or sufficient elements of a script, corresponding to the identifier of the business exist in the database with a score that exceeds a threshold.

In one embodiment, the success score for each script or element associated with the business for the request is computed as a part of step 210. In the embodiment in which script elements from different scripts may not be combined, the success score is a score for the script, and in the embodiment in which script elements may be combined to perform a single information retrieval, the success score may be computed for each element of each script. In one embodiment, the success score is a function of the number of times the script or element successfully performed its function, with scripts or elements that successfully perform their intended function having a higher success score than scripts or elements that do not. In one embodiment, the contribution to the success score of a successful performance of a function may be a function of how recently the function was performed, with more recent successful performance of the function of the script or element contributing more of a positive contribution to the success score for that script or element than a less recent successful performance of the script or element. The success score for a script or element may also be a function of the number of times the script or element was used in an attempt to retrieve information. In one embodiment, the success score for a script or element may additionally be a function of any or all of the date and time the script or element was supplied or last used or both, with a more recently supplied or used script or element having a higher contribution to the success score for that script or element than one less recently used or supplied or both.

If the identifier of the business corresponding to the request received in step 210 is not in the database or none of the one or more scripts associated with that identifier has a score above a threshold, or if the highest success score of any element used to perform a single one of the functions performed by any of the scripts associated with that business identifier is below a threshold score 212 (i.e. at least one function does not have an element that is above the threshold score), the method continues at step 232, described below.

If the identifier of the business is in the database and at least one script has a success score higher than the threshold or at least one element for every function performed by the scripts for the business identifier has a success score greater than the threshold 212, the method continues at step 214.

Select Script or Elements to Try First, Try, Check.

Whole Scripts.

At step 214, in the embodiment in which scripts are used in their entirety (as opposed to selecting script elements from several different scripts that each correspond to a single web site in order to retrieve data from the web site), a script corresponding to the business identifier, and that has a score higher than the other scripts corresponding to the business identifier is selected, and, using the selected script, an attempt is made to retrieve information from a web site of the business corresponding to the identifier, and the information retrieved is checked to determine whether it appears to be the information that was desired or that the script otherwise succeeded 214.

In one embodiment, the information retrieved is the information desired if the format of the information matches the format of the information expected. The format of the information expected is the format of the information retrieved at the time the script was programmed. In one embodiment, the expected format of each field to be retrieved is associated with each such field to identify the information expected. Conventional format detection may be used to identify if the information retrieved has the expected format, such as by determining if an amount has a string of digits with a decimal or comma in the third to the rightmost character position.

In the embodiment in which scripts are used as a whole, if the information retrieval is successful 216, the method continues at step 228, and otherwise 216, the failure for that script is logged and a determination is made as to whether there are other scripts for the business with a score above the threshold as described above 220. If there are other such scripts 222, the script with the next highest score is selected, the selected script is used to attempt to retrieve information from the web site and the information retrieved, if any, is tested to determine if the retrieval was successful as described above 224 and the method continues at step 216 using the newly selected script.

Use of Elements from Different Scripts.

In the embodiment in which script elements from different scripts, each provided for the purpose of performing one or more functions on the same web site, may be used to retrieve data from a single web site (e.g. a single retrieval of data may be made using script elements from different scripts provided by different people, and the script elements have an order corresponding to the order in which the script elements are used to retrieve data) operation proceeds as follows. At step 214, the script element for the first function of the script corresponding to the business identifier and that has a success score higher than the elements performing the same function from the other scripts corresponding to the business identifier, is selected. The selected script element is operated, and the success of the operation of that first element is checked. The above are performed as part of step 214.

In one embodiment, the functions performed by script elements include A) navigation functions (to go to an initial or subsequent web page); B) supplying information to the web site (e.g. a username and/or password, and a security question) and navigating to the next page, or C) retrieving information from the web site. In one embodiment, navigation and providing or retrieving information may be considered to be a single function performed by a script element.

In one embodiment, checking to determine if a script element that performed a navigation function was successful includes comparing the document object model of the web page that is received following the navigation function and determining if the fields on that web page correspond to some or all of the fields to be used by the immediately following element in the script. Fields to be used may include buttons or links, fields used for providing information to the web site for elements that provide information, or fields from which data is retrieved from the web site for elements that retrieve data.

In one embodiment, checking the web page returned as a result of navigation to determine if the navigation was successful also includes checking the document object model for the web page returned to ensure that certain components of the document object model used in a function following the function to be performed on that web page are not on part of the document object model for that web page. For example, if a script navigates to a log on page and the next function is to be performed is to provide the username, but not the password, because the password is located on a different page, a script element that navigates to a page that has a component labeled "username" (which was used in the script step immediately following the navigation) and a component labeled "password" (which was used in a script step following a subsequent navigation) would, in one embodiment, result in the check determining that the navigation was not successful. As described in more detail below, a label is text near or part of a field.

Checking to determine if an element that provides information to the web site and navigates to a different page (e.g. providing a username and password and pressing a submit button) is successful may be similar to the check to determine if a navigation function script element was successful. In another embodiment, checking to determine if submission of information is successful may also include comparing one or more components of the document object model of the web page that is returned following the submit operation that follows the submission of information to the web site with components of the document object model of a web page that was returned at a prior time. The comparison may include determining if certain text is on the subsequent web page, for example or may include determining whether certain text is on the subsequent web page at a particular location on that web page. Other embodiments may include checking for an absence of document object model components or values, such as those that may have been previously received when information was purposefully supplied incorrectly to determine how a response web page to such a condition would appear. If the function performed by the script element in a script following an information submission and navigation element of that script is an information provision function or information retrieval, the document object model of the web page returned following the submission of information is checked to ensure one or more components of the document object model to be used by that subsequent script element are contained in the web page returned following the navigation to the next page performed by the submission of information and navigation element.

Checking to determine whether information retrieved by a script element that retrieves information is successful, may include comparing components of the document object model of a web page that was used to retrieve the information with those on a web page that was used to program the script element, as well as checking the format of the information retrieved. In one embodiment, each piece of information that is retrieved by the script has a description of an "appropriate format" assigned to the retrieved information as described in more detail below. The description of the appropriate format may include whether the information should be primarily numeric or text, and may include other information such as number of digits to expect to the right of a decimal point for numeric information. To determine whether an information retrieval script element was successful, each piece of information retrieved is compared with the description of the appropriate format for that information. If the information has the characteristics in the description of the appropriate format for that information, the information retrieval is considered to be successful, and otherwise it is not. Other techniques for determining whether the information retrieved is successful may also be used.

Successful Element Operation, More Elements

If the operation of the script element was successful as described above, if there are more elements in the script 216, the date and time of successful attempted use of the script element just attempted is identified (e.g. from a system clock) and stored associated with the business identifier, script and element identifier, the next script element is selected with the highest score for elements that perform the next function among script elements having the same business identifier as the previous element, the selected script element is operated and the success of the newly-selected script element is determined as described above 218 The order of each script element is the same as is used to demonstrate operation of the web site on which the script operates in one embodiment of the present invention. The method continues at step 216.

Successful Last Element or Whole Script Operation, Log Success.

If the operation of the whole script or last element in a script was successful as described above 216, the current date and time is logged with the business identifier and an identifier of the selected script or element 228. Any users who had been marked as described herein to request them to demonstrate information retrieval from the website corresponding to the selected script or element are unmarked and the request for information retrieval from such website for the user who provided such demonstration may be fulfilled. The method continues at step 210. Information retrieval from the website for other users (and optionally the user who demonstrated information retrieval) proceeds as described herein, for example, with reference to steps 290-294.

During the attempted operation of each script or collection of elements that operate as a script in steps 218 and 224 as described above, information retrieval may be performed. For example, the script or the collection of elements that make up a script used may navigate to a web page, provide a username and password, navigate to a page that displays the information to be retrieved, retrieve the information, and the information is stored associated with the user identifier of the user for whom the information was retrieved. Step 228 includes storing and providing for display the information retrieved to the user or users for whom it was retrieved. Information retrieved as described herein from a user's accounts at multiple different web sites and businesses may be displayed in a consolidated fashion as part of step 228. The user may use the information retrieved for any conventional financial analysis purpose.

In one embodiment, the retrieval of information as described above is performed electronically, without human intervention. The script or elements are stored electronically, and so the use of them to retrieve information is also performed electronically, without human intervention. In one embodiment, any of the steps described herein are performed without human intervention, though some of them may be performed with human intervention.

Unsuccessful Script Operation.

At step 216, in the embodiment in which script elements from different scripts are not interchanged with script elements from other scripts, if any information retrieved does not appear to be the information desired, an indication of an unsuccessful retrieval is logged with the business identifier and the script identifier and the date and time, and a determination is made as to whether there are additional scripts for the business identifier that were not already selected and attempted as described above for scripts that have a score above a threshold 220. If not 222, the method continues at step 236 in one embodiment, or 232 in another embodiment. Otherwise 222, the script for the business identifier with the next highest score is selected, an attempt is made to retrieve information from the business or web site corresponding to the business identifier using the selected script and, if the attempt is successful, the information retrieved is checked to determine whether the information retrieved appears to be the information desired 222, and the method continues at step 216.

The use of different scripts or script elements from different users can provide "self healing" retrieval of information. If a script no longer works, another script can be used to take its place. If a portion of a script stops working, a portion (i.e. an element) of a different script may be used to take its place.

Unsuccessful Script Element Operation.

In the embodiment in which elements from different scripts (or those supplied by different people) that each perform different functions to perform a retrieval of information may be used together to retrieve information at step 216, if any script element is unsuccessful 216, an identifier of the business, script and element that did not operate properly is logged 220 with the date and time. A script element does not operate properly if information retrieved does not appear to be the information desired (for script elements that perform retrieval of information from a page), if the response to information submitted is inconsistent with that expected, as described above, or any navigation element is unsuccessful as described above.

As part of step 220, a determination is made if there are additional script elements for the business identifier that were not already selected, but that perform the same function as the unsuccessful script element and that have a score above the threshold score. If not 222, the method continues at step 236 in one embodiment and step 232 in another embodiment and step 232 in another embodiment.

Otherwise 222, the script element for the same business identifier, with the next highest success score that performs the same function, is selected, an attempt is made to operate the script element, a determination is made as to whether the script element performed its function successfully 224, and the method continues at step 216.

No More Scripts and None Appear to Retrieve Information or at Least One Element was not Successful and No Other Elements for the Same Function.

At step 236, the user is asked if the user would like to set up a new script or element by demonstrating information retrieval for the business so that subsequent automatic information retrievals may be performed. An automatic information retrieval is one where one or more scripts are used to retrieve information from a web site. The automatic nature of the retrieval refers to the retrieval process, once initiated. In one embodiment, subsequent automatic information retrievals may be initiated manually by the user (such as the one described above), or subsequent automatic information retrievals may be initiated automatically on behalf of the user as part of a regular schedule, such as weekly. In either type of retrieval, once initiated, if the script or scripts operate properly, the retrieval always or nearly always proceeds without human intervention.

In one embodiment, when the user first supplies the name of a business from which information is to be retrieved, the action is treated as a manually initiated request for automatic information retrieval and the automatic information retrieval will be attempted at or near that time. If such information retrieval is not successful or if there are no scripts having a score higher than the threshold for the name of the business supplied by that user, the user is asked whether the user would like to set up the information retrieval, as described above.

In one embodiment, step 210 may include scheduling automatically initiated automatic information retrievals. Such automatically initiated automatic information retrievals may be scheduled according to a schedule explicitly specified by the user, or a schedule may be implied when the user requests the first information retrieval.

Referring momentarily to FIG. 2B, a check may be made for scheduled automatically initiated automatic information requests that have not yet been fulfilled at step 290. If any such requests have not been fulfilled, one such unfulfilled automatically initiated automatic information retrieval request is selected, the database is checked in the same manner described above with reference to step 210 for the business corresponding to the selected automatic information retrieval, and the method continues at step 212 using the selected automatic information retrieval. The method also continues at step 290. If there are no more unfulfilled automatically initiated automatic information retrievals 292, the method continues at step 290, after waiting for a period of time, such as the start of the next day.

Thus, even if the initial automatic information retrieval for the user is successful, if the user sets up the automatic information retrieval to be initiated automatically, automatic information retrieval may not succeed at a later time because the web site is changed to operate differently.

It is noted that information retrieval may be performed by a server that is different from the computer system used by the user to demonstrate information retrieval. In the embodiment in which the server is used to instrument the page to the user, as the server is receiving the script information from the user as described herein, the server may also run the script portion received (optionally using a different username and password for the business that it has previously received from a different user), immediately or nearly immediately after receiving it, in essence following along with the user, to ensure that there is no information local to the user's computer system that is needed to run the script on a computer system different from the user's, as described in more detail below. In another embodiment, the server runs the script or one or more elements just received immediately after receiving all of it, as a final check, using the user's username and password for the web site or using a different username and password for the web site. In one embodiment, the server will indicate to the user the success or failure of such running of the script or element.

In one embodiment, in the event that the server cannot run the script successfully, even though the user's computer system ran the script successfully, the user may be instructed by the server to clear their cookies or a cache and repeat the process of demonstrating operation of the web site to allow script information to be received or generated as described herein.

When an automatic information retrieval attempt is not successful as described above, the users who have arranged for automatic retrieval of information from that business are marked to indicate that they should be asked to demonstrate some or all of an information retrieval from that business as part of step 236. When such users log in, such marked users may be asked to set up some or all of an information retrieval from that web site at that time. When information is ultimately retrieved from the business, step 228 will include clearing the marks for that business.

When the script or element is not successful, the failure is logged with the date and time and the business name and identifier of the script or element at step 232 as described above. When a user contacts the entity that retrieves the information, for example, to log in, or because a link was clicked on an e-mail (for example, an e-mail notifying the user that information retrieval did not work because of a change to the web site of the business from which the information was being retrieved) the log of failures is scanned, and if the user identifier of such user is on the log 234, step 236 is performed, and otherwise it is not.

If the user does not accept the option to demonstrate, or otherwise arrange for, information retrieval from the business 238, the user is informed that information retrieval is not available for that business at the present time 230. In one embodiment, if a user does not accept the option to demonstrate information retrieval from the business within a threshold amount of time after the unsuccessful attempt to retrieve information is made, or after a threshold number of users have not accepted such option for such business, or after a threshold percentage of users who have automatically initiated automatic information retrievals scheduled for such business have not accepted such option, a request is generated to a programmer who works for, or behalf of, the company that performs the information retrievals as part of step 230 who can demonstrate information retrieved from the business. In another embodiment, no such request to a programmer is generated, and so until a user is willing to make such arrangements, information will not be retrieved from such business.

User Accepts Invitation to Demonstrate Information Retrieval.

If the user agrees to demonstrate information retrieval from a business 238, a plug-in to the user's current web browser that operates as described herein is downloaded and installed 240 into the user's browser. In one embodiment instead of a plug in, a server retrieves web pages and serves them to the user after altering them as described within.

In one embodiment, the plug-in, or a program downloaded with the plug-in displays 242 at the top of the web browser icons that each correspond to a different type of web page that may be used to retrieve information from a business web site. For example, icons may be displayed for each of a page that receives a username and optionally a password, a page that receives a password (if the password is not provided on the previously described web page), a page that is displayed after a successful log in, a page that allows the user to view account information, and a log out page.

In one embodiment, each type of page is associated by the plug in with one or more fields. The fields may include text fields in which text is provided (e.g. a username field and a password field) fields from which text may be retrieved (e.g. a total balance field). Text may be columnar, i.e. arranged in a column or row, or non-columnar, which consists of a single field, for example a total. Fields may also include user interface controls. User interface controls may be buttons such as submit buttons or links to go to a new page. Such controls are referred to as fields.

The user is instructed to navigate to a page, and then indicate the type of page to which the user has navigated as part of step 242. The user navigates to a web page for the business, indicates the type of page, the URL of the web page is (optionally requested and) received from the browser by the plug in; and the business name received as described above, the URL of the web page to which the user navigated, and the type of web page indicated by the user is recorded 244.

In one embodiment, recording is performed by first recording the data locally by the plug in, and then the recorded data is provided by the plug in to a server via a network such as the Internet each time the user indicates sufficient data to perform a function. In another embodiment, the data is provided to the server when the user has indicated that all functions have been performed.

The page and data type information associated by the plug in includes the names of the fields (including links or buttons) that one could expect to see on a web page of that type. For example, on a login page, one would expect to see a username field and optionally a password field, as well as a submit button. In one embodiment, the button is not part of the data and type information for the page and in another embodiment it is.

Some fields may be represented as alphanumeric text, other fields may be represented as numeric text only (with numeric punctuation like commas, periods, parenthesis, etc) and still other fields may be represented as columns of these things. The plug in associates one of these data types with each field. As noted, the functions of the plug in described herein may be performed by a server instead.

In one embodiment, some fields are associated by the plug in to be required, and other fields and/or user interface controls are associated by the plug in to be optional and such information is received as part of step 240, for example, as part of the plug in.

The name of each field is displayed to the user (and optionally indicated to the user as being required or optional), and the user is allowed to select a first name of a field from the field names 248. The user is instructed to indicate the location on the browser window of the field corresponding to the selected field name 250 and the user uses the mouse to identify the location selected field on the screen.

In one embodiment, step 244 includes instrumenting the displayed web page in the following manner. As noted above, each field name is associated by the plug in with a type of field. For example, field types may be buttons or links, columnar data and non columnar data. Each time the user selects a data type whose location the user will indicate, the displayed web page is instrumented to cause the browser to highlight on the web page any data that potentially corresponds to the type of the field the user has selected to be highlighted, as the user moves the mouse cursor over that piece of data.

For example, if the user selects a field with a columnar data type, as the user moves over tables that have a threshold number of columns containing text, the column under the user's mouse cursor is highlighted, for example, by surrounding it with a box of the same color as the field name the user selected. The other field names are displayed using different colors.

In one embodiment, the plug in instruments the web page to highlight only the fields on the web page that correspond to the data type expected for the name of the field the user has selected. For example, if the user selects a name of a field that is expected to be a button or link, the plug in will only highlight buttons or links on the web page. If the user selects a name of a field that is associated by the plug in as columnar numeric data, only numeric data arranged as a column having a threshold number of rows is highlighted by the plug in as the user moves the mouse cursor over such data.

The user's indication of a location of a field (e.g. a mouse click while a field or user interface control is highlighted) is received and the location of the field is identified, in one embodiment as the page document object model identifier of the highlighted component of the page (for example, using the location of the mouse cursor when the user clicked the mouse) 252. The identifier may indicate an individual field or link, or button or a column of a table. In one embodiment, the document object model identifier is an Xpath expression, though other embodiments may use other identifiers.

In one embodiment, the document object model identifier is an Xpath expression that is defined relative to an anchor point, such as a <table> tag and all such information is stored as part of the script or script element. The anchor point may be considered to be fixed (e.g. the first table tag) or variable (any table tag), so that changes to the other elements on the page will not affect the operation of the script or element. When the script is operated to retrieve information as described herein, the anchor point is located and then the Xpath expression relative to that anchor point is used to retrieve information when the script or element. If the anchor point is variable, all potentially matching anchor points may be used to attempt to locate the first one that has a portion of the page that matches or otherwise corresponds to the relative Xpath expression from that anchor point, or that has data at a relative Xpath expression from that anchor point for which the format of the data corresponds to that which is expected as described herein.

In one embodiment, when a portion of a column of a table is indicated by the user (e.g. because the entire column is not able to fit on the displayed page), an identifier of the entire column of the table is used as the identified location.

The name of the field, and its location (e.g. the identified document object model identifier) is stored 254 associated with the other information for the page stored as described above.

In one embodiment, once a user indicates a field, that field remains highlighted in the color corresponding to the name of the field, and any such field is not highlighted in a different color as the user moves the mouse cursor over them as described above when the user is indicating a different field.

The user may then provide an indication of an additional action the user will perform next, and such indication is received 256. The action may be to select the location of another field (including data, a button, or a link) or to supply the URL of, another type of page, and navigate to it or indicate they have already navigated to it or to indicate that they are finished indicating data fields and page types. If the user indicates that they will identify the location of another data field or button on the page 258, the user may select the next field name using the list of field names and such selection is received 260. The method continues at step 250 using the newly selected field name.

If the user indicates that the next action is not to select a different field name (e.g. the user indicates the action is to select a different page type or quit), in one embodiment, a determination is made 262 as to whether all of the required field names on the page have been indicated as described above. As noted, in one embodiment, some of the fields for a page type are optional and the rest are required, and so step 262 involves checking whether the required fields have been indicated. If there are additional required fields for the page type for which the user is currently indicating 264, in one embodiment, the user is instructed 266 to complete indicating the locations of the required fields and the method continues at step 256. If there are no additional required fields for the page type for which the user is currently indicating 264, the method continues at step 272.

At step 256, the user may indicate as the next user action, an indication that the user has navigated to, or supplied the URL of, a different page, or that all pages required or otherwise used for data collection have been indicated and there are no more pages.

In one embodiment, if the next user action indication is that the user has navigated to, and wishes to indicate locations of fields such as data elements and buttons on, another page 272, the user will specify the type of page as part of the next user action indication and such type of page is received as part of step 256. The method continues at step 244 using the page to which the user navigated. In another embodiment, the user may specify a URL to navigate to, as part of the fields for the prior page and such URL will be recorded with the other fields for the page.

A next user action indication may be that the user has completed indicating field locations on all web pages, indicating that there are no more web pages to be indicated, and if the user so indicates 272, any information recorded and not already provided to the server from any plug in is provided to the server, and an attempt is made by the server to use the information recorded to retrieve information from the web site in the manner described above, but only using the information (e.g. username and password) received from the user as described herein 276. (The script produced is intended to be used, and is used, to retrieve information from the web site using information such as usernames and passwords for other users as well). The format of any retrieved information is checked as described above as part of step 276. If the format of the information matches the format of the type of information expected for each retrieved data field 278, in one embodiment, the method continues at step 284 as shown by the dashed line in the Figure, and in another embodiment, the method continues at step 280.

At step 280, the information retrieved from the web site may be optionally shown to the user to allow the user to verify that the information retrieved is the information desired. The user may then indicate that the information is either correct or incorrect, and if incorrect, the method may continue at step 242 or at step 230.

If the format does not match the format of the type of information expected 278, in one embodiment, the user may be prompted to correct the locations of any fields with an improper format as described in more detail below or in another embodiment shown in the Figure, the method continues at step 230 of FIG. 2A.

If the user indicates that the information retrieved is correct 282, a script or script element is built and stored that is associated with the user name of the business, that includes the URL of the first web page which should be navigated to, and for each web page, any information to be provided to such page (which may be specified by the field name as described above) and the DOM element to which the information should be provided, any information to be retrieved from the page (specified via the field name in one embodiment) and the DOM element from which the information should be retrieved, and the link or button, if any that is associated with the URL of the next page which should be used in order to perform a next step (or the URL itself if such URL was manually provided) 284. Each of these items is stored in the script or element using an order that may be the same or similar to that which the user used when demonstrating the information retrieval used to produce the script. In the case of a script element, an identifier of the element is stored with the element, each element having an order with respect to the other elements in a script. The method continues at step 210.

In one embodiment, the user may specify the locations of one or more optional fields for a page. In one embodiment, a page is a logical page, which may be made of one or more physical pages. For example, to supply a username and password may require the user to supply a username on one page and a password on a different page.

One such optional field may be a button or link to be clicked that takes the user to a subsequent physical web page that is part of the logical web page on which information may be retrieved or provided. The button or link and a field name that indicates that the button or link is used to navigate to a subsequent physical page on the logical page is stored in the same manner as other fields and their document object model identifiers as described herein.

A Brief Example.

A brief example will now be described. In this example, a first business entity collects transaction information such as credit card transactions, for example, at least one of which represents the purchase price of one or more goods or services purchased and supplied to its users. Any of several users may log on to a web site operated by the business first entity and view transaction information from the entity that collects it. In this brief example, the user is required to traverse only two pages in order to retrieve information from the web site: a log on page, and a transaction page. When the user logs in to the web site using the log on page, a list of transactions for the past month are displayed.

According to the present invention, a user uses a second business entity, independent of (e.g. not under control of and not controlling) the first business entity, as an agent to occasionally collect information from the first web site on behalf of the user and to display it to the user each time the user logs in and requests it. The present invention may be used to collect information from any number of other web sites and consolidate it for each user for whom the data was collected, but in this brief example, data is collected from only one web site, that operated by the first business entity described above. The user logs on to a web site operated by the second business entity, and provides to the web site information, such as a username and password, that the second business entity could use to automatically retrieve transaction information from the web site of the first business entity if the second business entity had sufficient information about operation of the web site of the first business entity to do so. The username and password are provided as part of a request to regularly (e.g. daily or weekly) retrieve information from the first business entity's web site.

When the user specifies to the web server of the second business entity, the URL of the web page and/or the business name of the first business entity, the web server of the second business entity checks to determine if a script is available that instructs the second business entity how to operate the web site of the first business entity to retrieve information on behalf of users. If no script for that URL or business name is stored that successfully retrieves information, i.e. has a score above a threshold as described above, the user will be asked by the web server of the second business entity if they would like to demonstrate information retrieval from that URL or the web site corresponding to the business name of the first business entity. If the user agrees, in one embodiment, a browser plug in is downloaded and installed in the user's browser and the user is asked by the plug in to navigate to the log in page of the first business entity. The user does so and the plug in records the URL used. The plug in then causes the browser to display in a row across the top of the browser window a list of the possible page types and a user interface control such as a checkbox that enables the user to select the type of page currently displayed. When the user makes a selection of a type of page, the selected type will be received by the plug in.

If the user selects a type of page, the plug in causes the browser to display the names of the required and optional fields the user may specify for that type of page along the right side of the browser window, each field displayed in a different color, along with a parenthetical "required" or "optional" to indicate whether the field is required or optional for that type of page as described above. For example, if the user selects the type of page as a log on page, a required field for a log on page may be "username" and an optional field for a log on page may be "password" (to allow for the fact that the password may be entered on a different page). An additional required field may be a "submit" button. A user interface control such as a check box is near each field name displayed to allow the user to select one field name at a time, and the plug in will receive such user selections. Assume the user selects the red "username" field name.

The actual web page to which the user navigated is displayed in the remainder of the browser window not containing the other information described above (i.e. the web page is displayed a rectangle containing the area of the browser window in which web pages would ordinarily be displayed that is not occupied by the names of types of pages along the top and the field names along the right side).

The plug in has associated the username and password field names to correspond to input text boxes, and the submit button to correspond to a button or link. When the user selects the username field name from the three field names on the right, the plug in instruments the web page to cause the text input box under the mouse cursor to be surrounded in red when the user moves the mouse cursor over any such text input box, and to report the DOM identifier of the text input box clicked on by the user. Such instrumentation may be performed for all three field names, and the instrumentation for each field may be activated upon selection of that field name, with instrumentation for other fields not active until their field names are selected. The instrumentation for fields already selected may be disabled upon selection of a different field name, except for the highlighting of the prior selected field locations.

In one embodiment, the DOM identifier identifies the input box as such, along with a numeric identifier of the text input box that indicates the order the text input box was received relative to other text input boxes that have the same parent. The colored surround of the text input box controlled by the instrumentation of the web page will cease to be displayed when the user moves the mouse cursor away from such text input box, such that the mouse cursor is no longer over the text input box (or an area nearby it).

The user will hover over the mouse cursor over the text box on the web page that allows them to enter their username and click into the box and the text input box into which the user clicked will be surrounded in red as a result of the instrumentation of the plug in. The plug in will, again as a result if the operation of the instrumentation of the web page by the plug in, receive the DOM identifier of the text input box the user clicked, associate the DOM identifier with the field name (e.g. "username"), page type and business name or domain name (the business name may be passed to the plug in by the web page that installs it or the domain name may be obtained using the URL the user uses to reach the first web page) and the red colored surround of that text input box will remain displayed. The user may enter his or her username into the box.

The user will then use the list of field names to select the blue password field name, for example, by checking a checkbox next to the name. Again, any text input boxes on the page except for the one the user indicated as the password text input box, will be (or have been) instrumented by the plug in to display with a blue surround when the mouse is over or near that text input box as described above (the plug in may cause the web page instrumented to be displayed or redisplayed after it is so instrumented), and to report to the plug in the DOM identifier of any text input box clicked. The user then locates the password text input box using the mouse cursor (with any text input boxes the mouse cursor moves over being highlighted by being surrounded by a blue box as the user moves over them, the display of the blue box being removed when the user moves the mouse cursor away from them), clicks into it, the blue highlighting remains in place and the user may enter their password into that box. The plug in receives the DOM identifier of the text input box into which the user clicked, and the plug in records it associated with the field name, "password", the type of page and the business name or domain name of the web site.

The user then selects the "submit button" field from the right hand side of the page and the plug in instruments buttons or buttons and links to be highlighted by surrounding them with a green box, and to report their DOM identifier if clicked. When the user moves the mouse cursor over a button or a button or a link, a green box surrounds that button or that button or link, the box no longer appearing as the user moves the cursor away from the button, or the button or link. When the user clicks the button, the green box surrounding the button or link remains displayed on that page, the DOM identifier of the button is received by the plug in, and the browser then responds to the pressing of the submit button or link in the conventional fashion. In one embodiment, the submit button is indicated by the plug in programmer as a button that should not be selected until all of the other required fields have been indicated as described above. In the event that a user selects the "submit" field name prematurely, the plug in indicates to the user that the other required fields must be indicated before the submit button may be indicated. In one embodiment, operation of submit buttons and links may be disabled when the page is instrumented to prevent the user from pressing them until the locations of all other required fields have been identified as described herein. The button press is then executed.

When the next page loads, the user may indicate the type of page as a transaction page using the same user interface displayed across the top of the page. The page types may be displayed in the order in which they are expected to be encountered. Transaction pages may be associated by the plug in with three required fields: a transaction date column, a transaction description column and a transaction amount column. The names of each of the three fields is displayed along the right side by the plug in, in three colors different from one another: red, blue and green.

The user selects each one of the three field names, for example by using a checkbox beside each field name, and, because columnar data is associated with each such field by the plug in, the columns on the web page not already indicated as corresponding to a different field are instrumented to be displayed as if they are surrounded by a box having the same color as the field name most recently selected. If the top or bottom of the column is not displayed because it runs off the page, in one embodiment, the top or bottom of the colored box is not displayed, to indicate that the selection extends beyond the page, up or down. Each time the user makes a selection, the DOM identifier of the selected column is stored associated with the field name, the page type and the business name or domain as described above. When the user indicates they have completed identifying the locations of fields on the web page, and there are no more pages, the plug in provides the field names, DOM name, page type and business name for each field to the server, which stores such information as a script. In the embodiment in which script elements from different scripts may be used, the information received by the server that is related to each function may be stored at the server as a separate script element.

The server may then use the script or elements to retrieve information from the business or web site for any users who have identified to the server that they have an account at that business or web site and who have provided to the server log in information such as their username and password at that business or web site. To use a script or element to retrieve information from a web site, the initial URL is used to retrieve a web page from the business or web site, and then the DOM names are used to locate the proper web page element on which a function is performed. The function is a function associated with the field name that corresponds to the function (e.g. entering information or navigating) performed by the user who demonstrated information retrieval or to a retrieval function. The server provides the specified text input boxes with text and clicks links or buttons in the same way a user of that web site would and in the same order the user that demonstrated operation of the web site did when the field names were associated with DOM identifiers as described above, such information having been provided to the server by the user as described herein. The server retrieves and optionally stores information corresponding to other fields as indicated by the user.

In each case, the DOM element operated is the one corresponding to the DOM identifier provided to the server by the plug in. However, the server may enter some or all of the text input boxes using text corresponding to the user for which the information is being retrieved. For example, if user A demonstrates operation of the web site using user A's user identifier and password, to retrieve information for user B, the script obtained when user A demonstrated operation of the web site may be used, except using user B's user identifier and password. Data may be retrieved in this fashion using information from any number of other users.

Overview of Script Repair.

In one embodiment, the web page is instrumented by the plug in so that, when the user indicates a location of a field, not only is the page document object model identifier of the column stored associated with the field name, but other information is also retrieved from the web page and stored associated with the script information for that web page. The other information may include any or all of the following: for a button, the label displayed on that button and the labels of other buttons, for a link, the text displayed as part of the link and the text displayed as part of other links, for data input fields, text near the field, for non columnar data, text displayed near such data, and for a columnar data field retrieved from a table, the contents of the title row from the column corresponding to the field, the title row of each other column in the table, and the title row contents of other tables. Such other information may be collected and stored associated with the DOM identifier of the field as part of step 254 when the user indicates the location of a field as described herein.

Storage of such other information may allow for the automatic repair of a script or element that no longer operates properly, for example, because the order of the page data elements having the same type as a field has changed on the page for example, because one has been added or removed, the order of the columns within a table has changed, or one has been added or removed, or another change has been made.

As described herein, the label of the button acting as a field, text of a link acting as a field, text displayed near a data input field or a non columnar data field or the title row of a column field is referred to as the "label" of the field.

In one embodiment, as data elements are operated as part of steps 214 or 218 (e.g. used in the process of data retrieval in the same way a user would, for example, a button or link is operated by selecting it, and columnar and non-columnar data is operated by retrieving it and testing the data retrieved for the proper type as described above), the label for the field is again retrieved from the fields being operated, or their surroundings.

If the labels have changed, any label that has changed is looked up in a synonym table of common labels and their synonyms to identify whether the changed label is a synonym of the former label. If so, the new label may be stored, and if not, the operation of the field may be considered to be "suspect". As the script or element is being used to retrieve data, a check is made to determine if operation of the field is not successful (e.g. for a field from which data is to be retrieved, the type of data retrieved does not correspond to the type of data expected, for an input field for which data is to be provided, the field does not exist on the page, and for a link or button, the link or button does not exist on the page, or the page following operation of the link or button does not contain the DOM elements used by the script for the next page).

In one embodiment, when the operation of a field programmed on a script or element is unsuccessful, the script or script element may be immediately considered to be unsuccessful in which case, the "no" branch of step 216 is taken, and in another embodiment, operation of the script continues if possible until operation of the script element or script itself is unsuccessful.

In one embodiment, if operation of a field in a script or element is unsuccessful, an attempt at repairing the most recently used script (or most recently used element) is made as described in more detail below before the user is asked to set up a script for the business. If a sufficient amount of confidence exists in the repaired script, the user may be asked to verify the repair, and the user is asked to demonstrate operation of a web site only if the repair is unsuccessful or an insufficient amount of confidence exists in the repair. In one embodiment, the verification process may include, for each field or each field repaired, or each field repaired that has a confidence level below a threshold, displaying on or near a web page retrieved that includes data, button or input fields, providing the field in a manner that corresponds to a color, unique among the fields on the page, and surrounding the field to which the field name corresponds with a colored box that corresponds to the color of the field name. The field name may be displayed with two buttons, one to allow the user to accept the field location displayed and one to reject it. If the user presses the accept button, the identifier of the field is stored associated with the field name in the newly repaired script or element. If the user presses the reject button, the user may be requested to move the mouse cursor over the data (e.g. input box, button or data, such as a column of data) containing the field on the displayed page that corresponds to the reject button the user just pressed, and data on the page that could correspond to that field may be highlighted as the user moves the mouse cursor over it until the user clicks the mouse as described above, and the name or other identifier of the data corresponding to the user's selection, location (e.g. DOM identifier), and its label, is stored as the location of the field in the newly repaired script or element as described above. In one embodiment, a newly programmed or newly repaired script or element may be assigned an initial score that may allow it to be chosen for use, sooner than it would be chosen if it was assigned a score based on not having been used successfully.

Thus, in one embodiment, the user is asked to do a simpler validation of a repair if the repair is believed to be successful. The confidence in the repair may be a function of whether the results of the repaired script were successful and the degree to which the script had to be altered to produce the successful result. In such embodiment, as shown by the dashed line in the figure, instead of continuing at step 232 as described above, the method continues at step 310 of FIG. 3.

Figure 3:
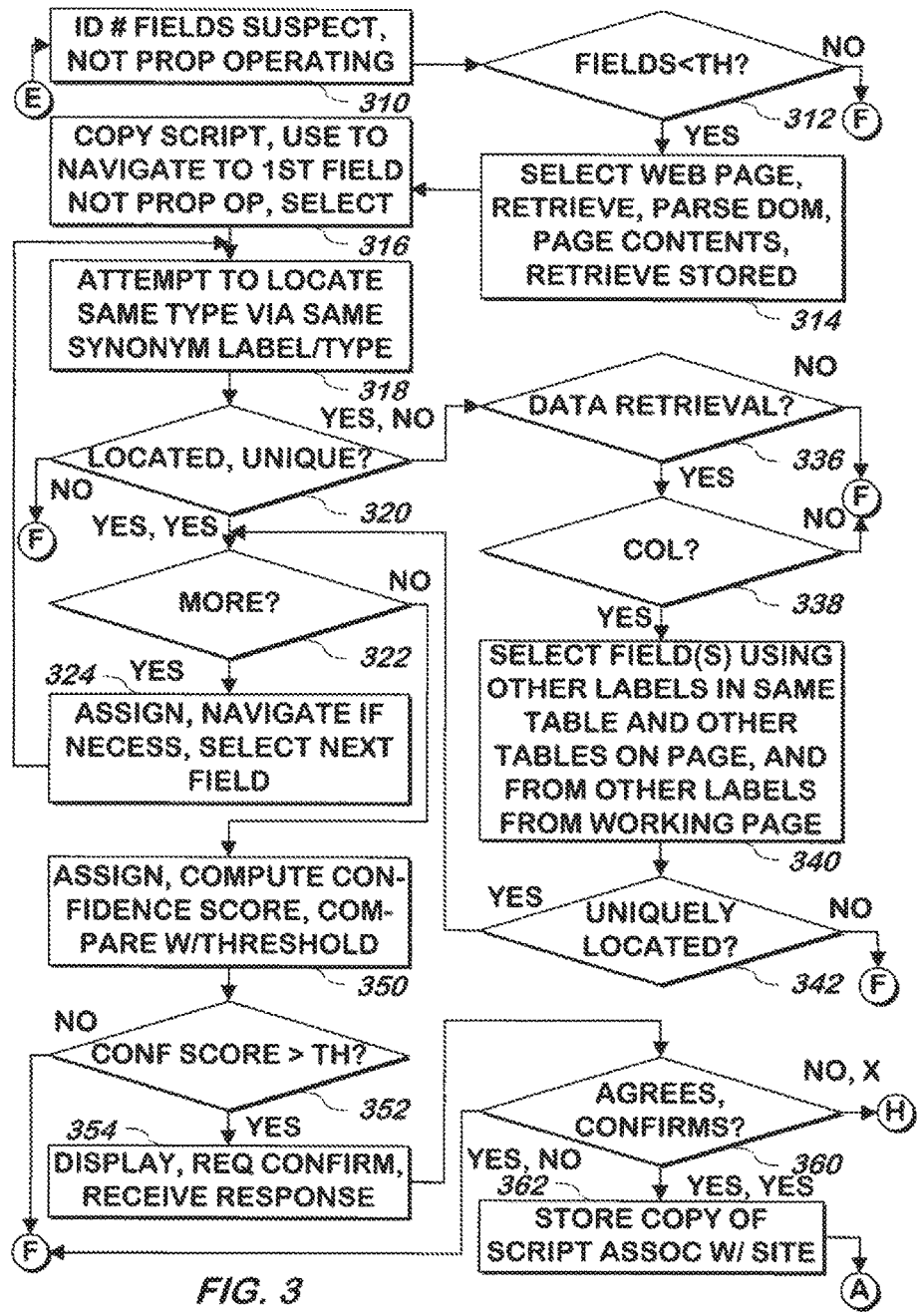
FIG. 3 continues the flowchart of FIGS. 2A and 2B in one embodiment, and adds the functionality of attempting to automatically repair a script.

Referring now to FIG. 3, a method of automatically correcting DOM identifiers of fields specified in user-supplied scripts used to operate web pages to retrieve data is shown according to one embodiment of the present invention. The automatic nature of the correction implies that the correction is identified without human interaction or without anything but trivial user interaction. However a human-supplied indication of the identified confirmation may be employed as described herein.

The number of fields that did not operate properly and number of fields that were suspect on a web page or a web site are identified 310 and compared with one or more thresholds. The threshold may be a threshold for a total number of suspect and not properly operating fields, or the threshold may be compared with a result of a function of the number of such suspect and not properly operating fields. For example, the number of fields marked as suspect as described above may be multiplied by a factor, such as 0.5 and added to the number of not properly operating fields and the result may be compared to a threshold of "3". The number of such fields may be all such fields on the web site or may be all of the suspect fields plus the fields not operating properly on the first page at which at least one such not properly operating field was encountered.

In one embodiment, if the result is not less than the threshold 312, the method continues at step 236. In such case, the number of changes to the page is considered too great to have a threshold degree of confidence in a repair, and so repair of the script is not considered desirable.

It is noted that, as described above, the label for a field is adjusted during operation of the script if the label has merely been changed to a synonym label for fields that have the exact same DOM identifier. However, what follows is the process of attempting to locate the same information that has been moved or had other information added or removed so that the information is now located under a different DOM identifier and so the current DOM identifier of the script does not operate properly.

If the result is less than the threshold 312, the script or element that had scored the highest before the field did not operate properly is copied, and the copy is used to navigate to the first field that did not operate properly, that field is selected for repair 316, and an attempt is made 318 to locate the same type of field as the selected field (e.g. link or button, text entry field, columnar data to be retrieved or non columnar data to be retrieved) on the page that has the same label or a synonym label on the same page and, for fields corresponding to data to be retrieved, has data of the same type expected (e.g. currency, date, etc.) as the field, before it did not operate properly, such information having been stored when the program for the page was created. In one embodiment a field corresponding to the same label is preferred over a field corresponding to a synonymous label. In other words, a field with the same label that appears to have changed locations on the page is preferred over a field with a synonym label in the same location, though in other embodiments, the opposite preference is used.

If such a field is located, and it is unique, meaning there are no other fields on that page with the same label or a synonym label having the same field type and, for a field to be retrieved, the same data type as the selected field, and for a field to be retrieved, the label has high probability that it corresponds to only one field having the same data type as the selected field 320, if there are more fields that did not operate properly 322, the DOM identifier of the field that was located as described above is assigned to the copy of the script or element in place of the location of the selected field that was not operating properly, the next field not operating properly is selected (and, if necessary, navigated to, using the script or element that had scored the highest before the field did not operate properly) 324 and the method continues at step 318 using the newly selected field 324. A label does not have as high probability that it corresponds to a field if it is nearby (e.g. over and to the left of) two fields of the same type as the selected field (e.g. near two input boxes), and, for fields to be retrieved, near two or more such fields with the same data type as the selected field.

In one embodiment, if there are no fields on the page with the same type as the field that did not operate properly that have the same label or a synonym label, and having a data type of the type, as the selected field expected 320, the method continues at step 236. An automatic repair is not attempted in this case.

In the event that multiple fields are located on the same page with the same label or a synonym label and having the same field type as the selected field 320, if the field that is not uniquely located is not a data retrieval field 336, the method continues at step 236. If the field is a data retrieval field 336, but not a columnar field 338, the method continues at step 236. An automatic repair is not attempted in these cases, in one embodiment.

If the field is a data retrieval field 336 and the field is a columnar field 338, the labels from the other columns in the table or tables containing the columnar fields that have the same or synonym labels as the one previously stored for the not operating field and that are located on the same page as such not operating columnar field, and the previously stored labels from other columns in the table containing not operating field and the previously stored labels from other tables on the same page containing the not operating field when such field was operating are used to attempt to uniquely identify 340 the new location of the not operating columnar field as described in more detail below.

In one embodiment, each of the fields that have a label similar or identical to the field that was formerly operating properly and are columnar fields with the same data type as the field that had been operating properly is assigned a score. The score is a function of whether the label for the field is the same or similar (with labels that are the same providing a higher contribution to the score than those that are similar), the number of other previously stored labels from the same table as the field that had been operating properly that are contained in the table containing the field being scored (the higher the number, the higher the contribution to the score), and the number of previously stored other labels from tables other than the table containing the field that had been operating properly but recently did not operate properly that are used as labels (either the same label or a similar label) in the table being scored (the lower the number, the higher the contribution to the score).

In one embodiment, as part of step 340, the scores are compared, and if the highest one of them exceeds a first threshold and exceeds the next highest score by a second threshold, the field corresponding to the highest score is considered to be uniquely located and if all of these conditions are not true, the field is not considered to be uniquely located.

If the field is uniquely located 342, the method continues at step 322 and otherwise 342, the method continues at step 322.

At step 322, if there are more fields that did not operate properly, the DOM identifier of the previously identified field is assigned to the copy of the script to replace the selected field not operating properly, the next field is selected for repair, and the method continues at step 318 using the newly selected field.

In one embodiment, there will only be one web page containing fields that did not operate properly, as the script for a web page will not proceed to subsequent pages once a field that does not operate properly is encountered. In such embodiment, the repair attempt is made only for the page containing the first field that did not operate properly, and for other not properly operating fields on that page. If subsequent pages also contain fields that do not operate properly, they will subsequently be detected upon the next operation of the script and an attempt will be made to correct them or a user will build a new script or element that processes such pages as described herein.

In another embodiment, once a field does not operate properly, subsequent navigation fields will be used anyway and all of the fields not operating properly will be identified and attempts made to correct their DOM identifiers or a new script or element that processes them will be build by a user as described herein. In such embodiment, step 324 may include attempting to use navigation fields that operate properly to navigate to pages containing the next field not operating properly.

If there are no more fields not operating properly 322, a confidence score is assigned to each of the fields that had not been operating properly and the scores are summed to provide a score for the script or element for which an automatic repair is being attempted 350. The score may be a function of the type of field, with navigation fields having a lower contribution to this component, data retrieval fields having a medium contribution, and data entry fields having a higher contribution; whether the label of the new field assigned to replace the field not operating properly was the same or synonyms (with fields having the same label having a higher contribution to this component than synonyms) and the number of other fields on the page that did not operate properly (the higher the number, the lower the contribution to the score). A confidence score for the attempted repair may then be assigned to repair as part of step 350 using these scores, for example, by selecting the lowest one, averaging them, or selecting the lowest one for each web page used in the information retrieval process and averaging the scores for each page.

If the confidence score for the repair exceeds a threshold 352, a result of the repair is displayed to the user and the user is requested to confirm that the script for the web site is operating properly based on the repair 354. For example, the page or pages containing fields that did not operate properly and were altered as described above may be displayed to the user, with the various fields for the page (including any new fields identified during the repair as described above) highlighted in colors that match the names of the fields which are displayed as described above.

If the user agrees to confirm the repair and confirms that the script for the web site (at least to the point of the pages the user sees) is operating properly 360, the copy of the script or pertinent element or elements, with the changes made to the DOM identifiers of the fields that had not been operating properly, is used to replace the script or elements containing the DOM locations of fields that were not operating properly 362, and the method continues at step 228 of FIG. 2A. If the user does not agree to confirm the repair 360, the method continues at step 230 of FIG. 2A. If the user agrees to confirm the repair but indicates that the script is not operating properly 360, the method continues at step 236 of FIG. 2A.

An Attempt May be Made to Predict the Location of Fields/Buttons: The User May be Asked to Verify or Select.

In one embodiment, steps 250 and 252 may operate with the following additions. At step 250, some or all of the fields (data fields, input fields or buttons) may be attempted to be located for the user and an optional confidence score may be assigned to each location of each such candidate field.

In this embodiment, expected labels (e.g. "password" for a password field), other characteristics (and scores for each) for each field may be associated with each of some or all of the fields associated with a page type, and/or the expected type of the data described above. Other characteristics may include potential document object model information, such as identifiers or types, or types of document model elements (such as a table) from which data should descend. Expected labels and other information may be assigned based on those that have been encountered on other pages that users have used to build scripts as described herein, with higher scores for those more frequently encountered, more recently encountered, or both. The confidence score for a candidate field or button may be a function of any or all of whether the label or other characteristics for a data element on a retrieved page matches one of the expected labels, and, in the case of a field to be retrieved, whether the other characteristics and form of any data matches the characteristics and form expected, or in the case of an input field such as a text box or button, whether the other characteristics of the input field (such as its name) matches any of the expected other characteristics. Other techniques may be used to identify candidate fields from among the contents of the retrieved page, such as by using the techniques described herein for script repair.

In one embodiment, certain fields may be expected to be displayed in a particular order or arrangement, such as expecting several different fields to be part of the same table, and so the confidence score for a field is also a function of whether the other the field has the order or arrangement expected, such as scoring fields expected as part of the same table higher if all fields expected are actually in the same table. For example, a transaction table may be expected to have a column of dates, a column of amounts with two decimal places and a column of text. The confidence score for a date column in a table without the other two columns would be lower than the confidence score for a date column in a table with the other two columns.

In one embodiment, data from a page is considered to be a field label if it is on the first line of a table above, or the last line of the table below, data of the expected type, if it is adjacent to an input field, if it is the label for a button, or the text of a link. Weights for each of the above-referenced conditions may be assigned and confidence scores may be identified by multiplying the score assigned to the label or other characteristic by the weight for the corresponding experience. Different weights may be used based on the position of a label, for example, with a higher weight for a label to the left of an input box than the weight used for a label below an input box, again, with the weights based on how common that type of experience has been when users demonstrate or confirm operation of a web site as described herein. A higher weight may be used if the label matches an expected label exactly, than if only a correspondence exists, such as by having extra words in the label that do not match one of the words expected. The weights may be assigned using conventional regression analysis of similar web pages from other web sites based on how often words in the label for the correct column are encountered, and how often encountered words turn out to be incorrect as measured by the user rejecting a selection as described herein.

In one embodiment, for each field or button on a page for which one or more candidate fields are identified as described above, the location of the candidate field or button that has the highest score exceeding a threshold is identified as the default candidate field location for its respective field. In another embodiment, such a candidate field location is identified as a default field location only if there is one and only one candidate field on the page that has a score that exceeds a threshold.

In one embodiment, conditions may be used in place of an explicit score. For example, when looking for a date in a transaction table, the location of the first date in a table that also has a column of text and a column with numbers with exactly two decimal places may be selected as the default location a date for the transaction page, without assuming a score.

In one embodiment, some or all default field locations on a page may be assumed to not require user confirmation to assign them as the field location, and no user input, such as is described below, may be required in order to add them to a script. In such embodiment, the user confirmation of the field location may be disabled for fields for which a default field has been identified. This embodiment may be used for default fields with sufficiently high confidence scores or those that satisfy all of their conditions, and if there are no other fields on the page that have such a high confidence score or satisfy the conditions. In one embodiment, if all of the field locations on a page are selected using default fields, in the embodiment in which no confirmation is required, the identification of the locations of the fields on the page may be indicated as being completed and the user may select the next page type.

In one embodiment, when the user selects the field to identify its location as described above, the default field is highlighted first and the user may select that field by confirming the default selection or may move the mouse cursor above a different field to select it as described above. Alternatively, buttons may be used to accept or reject the default field and if the user presses a reject button, the field selection procedure described herein is used.

Figure 4:
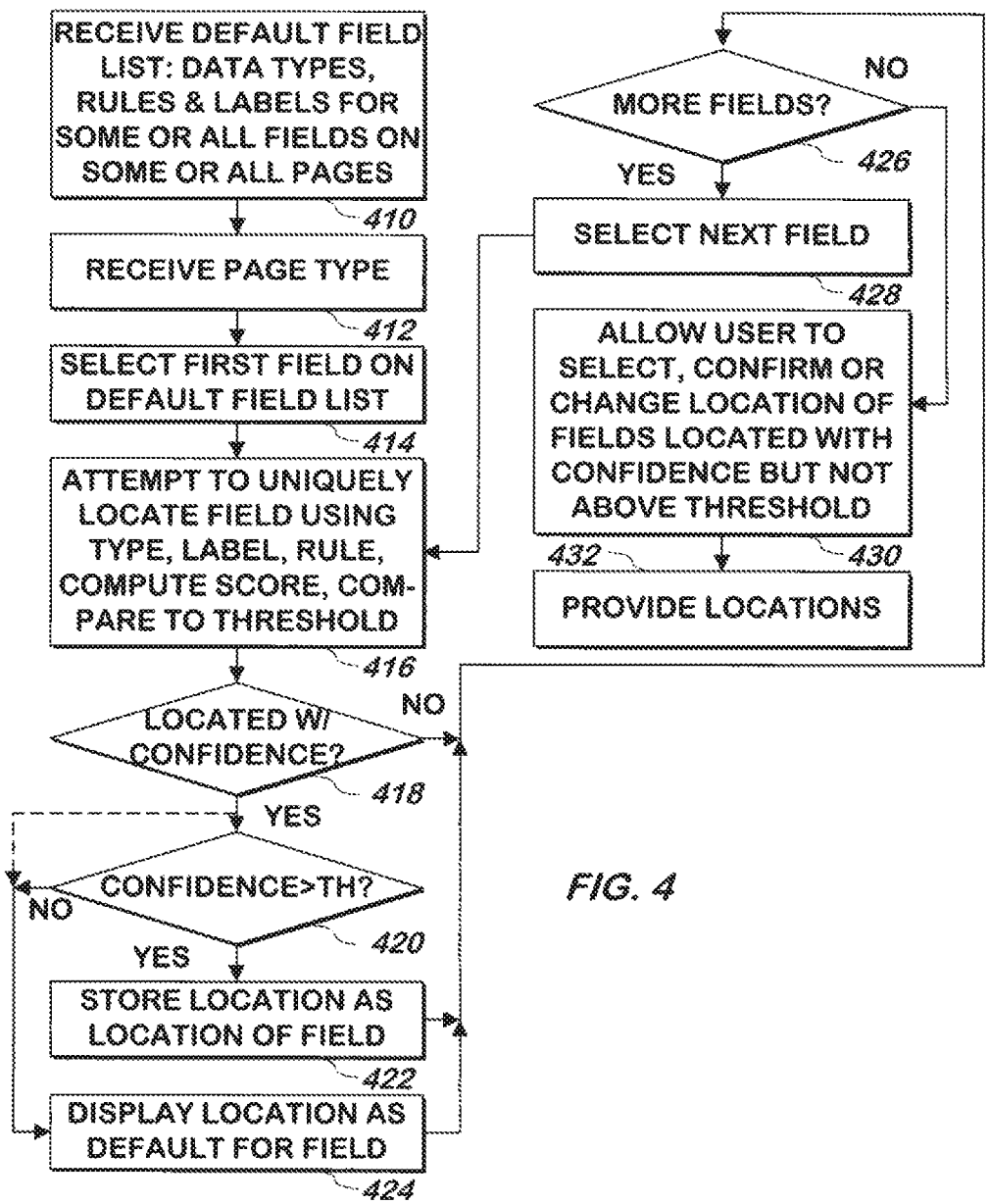
FIG. 4 is a flowchart illustrating a method of identifying a default field location according to one embodiment of the present invention.

Referring now to FIG. 4, a method of identifying a default field is shown according to one embodiment of the present invention. For each of at least some of the page types and each of at least some of the fields for each page type as described above, any or all of the following may be received: one or more of an expected data type, one or more expected field labels, one or more expected field names, and one or more rules 410. The complete list of such information is known as the default field list.

An example of an expected data type may include one of "text", "decimal 2", where the '2' indicates the number of expected places after a decimal point, or "date". An example of an expected field label or name may include "date" or "transaction date", in the manner described above for script corrections. An example of a rule for the transaction date may be "part of a table that also includes a text column and a decimal 2 column".

The page type is received 412 from the user after the user navigates to it as described above. The first field for the page type in the default field list is selected 414 and an attempt is made to locate 416 on the page just received one or more candidate default fields that meets the specified type, label or rule in the default field list for the selected field in the same manner as was described above for the correction of script. A candidate default field may be made up of a single button or link, a single data input element, a column of a table, or any other arrangement of data. In one embodiment, as part of step 416 a confidence score is calculated for each default field in the manner described above for script correction and the confidence score for each candidate default field is compared to a threshold and to the confidence score of other candidate default fields to identify as the default field the one candidate default field that exceeds the threshold, or the one with the highest confidence score for all candidate default fields for a field that exceeds the second highest confidence score of a candidate default field for that field by a threshold amount or percentage and exceeds the threshold confidence score. This technique identifies as the default field the one candidate default field or one that is much better than any other, though other embodiments may allow the candidate default field with the highest score exceeding the threshold to be identified as the default field.

The confidence score indicates the degree to which the candidate default field meets the requirements specified for the selected field in the default field list.

If one candidate default field uniquely meets the requirements for such a field 418, the location of the candidate default field is displayed as the default location for the selected field 424 when the user selects a field to identify its location as described above and the method continues at step 426, and otherwise 418, no location is displayed as a default location for the selected field and the method continues at step 426. In one embodiment, the location of the default field is displayed in the same way that the user's selection of a field is displayed, for example, by surrounding it with a box having the same color as was used to display, or as part of the display of, the field name. The user may change the location of the field from the default location to a different location, but at least the default field will be preselected for the user to save the user from having to locate every field location from scratch, as described above.

In one embodiment, if only one potential default field has a confidence score above a threshold, no confirmation by the user will be required as described in more detail below. In such embodiment, step 416 includes determining whether the confidence score exceeds a threshold. If the confidence score exceeds the threshold 420, in one embodiment the field location of the default field is stored as the location for the field, and the name of the field will not be displayed to the user.

At step 426, if there are more fields for the selected page type on the default field list, the next such field is selected 428 and the method continues at step 416 using the newly selected field.

If there are no more fields for the selected page type on the default field list 426, the user is allowed to confirm none, some or all of the default field locations of the fields for which they are displayed, indicate that the location of any field is different from the location of the default field displayed for that field and then change the location of the field using the user's mouse cursor as described above, or for fields for which no default field location was displayed, indicate the location of the field as described above 430.

As noted above, in one embodiment, as part of step 430 the user is allowed to confirm the field locations only for those fields for which the confidence score did not exceed the threshold.

The field locations confirmed or changed or selected, and optionally those for which the confidence score exceeded the threshold, are provided as the locations for the fields 432 as described above.

Different Elements May Operate Different Data Types.

In one embodiment, one page type is an "accounts" page, where names of the different accounts of the user are displayed. In this embodiment, a data field may consist of links to different accounts that the user has. The accounts may have different types, and the data received on the transaction data page reached by clicking each link may be displayed differently based on the type of account: that is, the transaction data on a transaction data page for a first type of account may be displayed differently from the transaction data on a transaction data page for a second type of account. Different script elements may be required to retrieve the data on the transaction data pages of each different account type.

When the script is operated or elements are operated to retrieve data using an accounts page with links to different account types, each such link on the accounts page that is returned after logging in as a user to a financial institution may be operated to retrieve information from all of the user's accounts at that financial institution. Thus, if a user has a checking account and a savings account, the links to the different accounts are retrieved from the accounts page, and then each link is used (e.g. one at a time, though both may be reached in parallel simultaneously) to reach each page with transaction data, and from each such page, transaction data may be retrieved.

In the embodiment in which script elements from different scripts may be selected, the use of different elements allows sequences of operations to be performed for which no full script has ever been received. Thus, the script elements from a first user who provides as described above script elements for retrieving checking and savings account transaction information from one financial institution may be combined with the script elements from a second user who provides as described above script elements for retrieving transaction data from a credit card account at the same financial institution to retrieve transaction information from the same financial institution for a user who has i) a checking account and credit card; ii) a savings account and a credit card; or iii) a checking account, savings account and credit card at the financial institution, in spite of the fact that no script was ever received to retrieve information from such combinations of accounts.

Selecting Script Elements Based on Other Factors.

In one embodiment, certain script elements to operate a page may be selected using other criteria in addition to the score for that script element. For example, once a page containing transaction data has been received from a financial institution, it may be further processed before transaction data is retrieved from it. Such processing may include identifying a similarity score that measures, at least in part, how similar at least part of the page retrieved is to at least part of the page that was retrieved when the script element for that type of page was initially defined, such information being stored with such script element, for example, by retrieving it from the page the user used to demonstrate operation of the portion of the web site corresponding to the script element.

Similarity may be measured by the words on the page (with the same words having a higher contribution to the score than synonyms, which have a higher contribution to the score than words that are neither the same or synonyms, and phrases of the same or synonym words having a higher contribution to the score than words that match individually), the structure of the page, and other factors. To select a script element, the script elements for the type of page (e.g. a transaction data page) expected (e.g. when one of the links from an accounts page is operated, for example by requesting the URL to which the link corresponds) may be investigated to determine a similarity score for how well the script element corresponds to the data on the page as described above. Script elements may be selected in descending order of similarity score from among those that have a score (that indicates how well the script element works as described above) that exceeds a threshold.

For example, if there are multiple script elements that process a transactions page, and one high scoring script element is stored associated with the phrase "Your credit card account ending with the number", that script element may be tried first when the same phrase is encountered on a transactions page. A higher scoring script element that also processes transactions pages that is stored associated with the phrase "Your checking account" and not stored with the phrase "Your credit card account ending with the number" may not be tried before the prior described script element, because it is less likely to be successful in retrieval of information from the transactions page encountered, even though both script elements process transactions pages. In one embodiment, only certain information is used to generate a similarity score, such as headers, text displayed in a font that is larger than normal, and the page title.

The methods described herein may be used for each of several web sites from which data is retrieved on behalf of users.

System.

Figure 5:
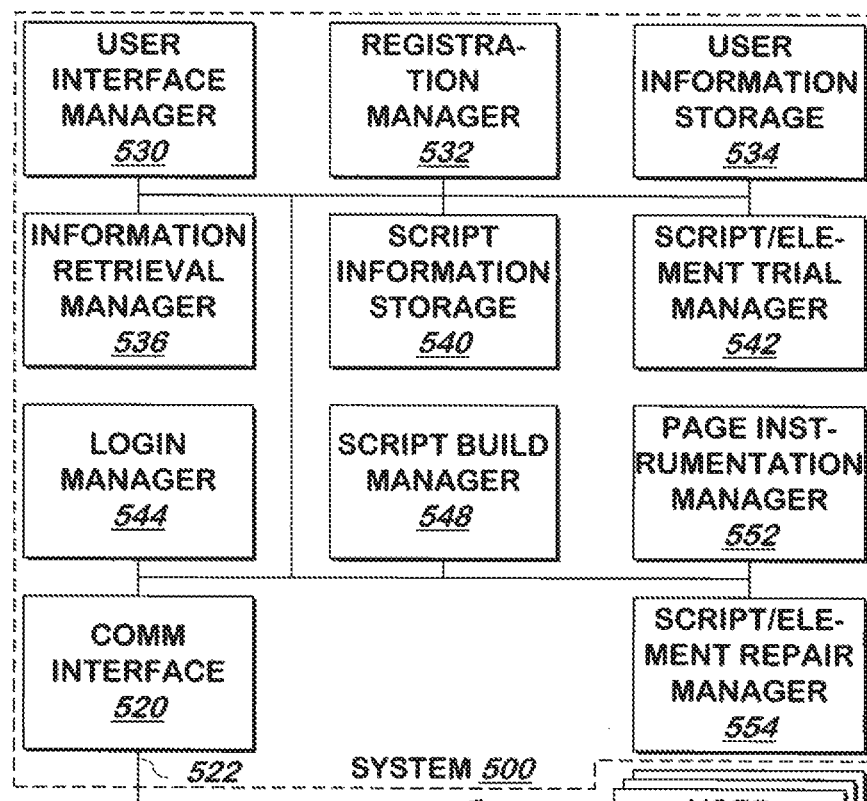
FIG. 5 is a block schematic diagram of a system for retrieving information from web sites using information received from many different users of those web sites according one embodiment of the present invention.

Referring now to FIG. 5, a system 500 for automatically retrieving web pages from web sites using scripts supplied by users who have accounts on the web sites is shown according to one embodiment of the present invention. The system 500 is at a different network location than the third party web servers 502 that provide the web pages described herein. In one embodiment, the users who have accounts on the web sites have accounts on the web sites for purposes other than preparing scripts for the web site, for example, to conduct transactions using one or more services offered by a third party for which the web site is operated.

Third party web servers 502 may each be one or more conventional web server computer systems, are operated by parties who are independent from the party operating system 500, and are coupled to network 506. Third party web servers 502 process transactions for users who can communicate with those third party web servers 502 using user computer systems 504, which may include one or more conventional computer systems such as a personal computer system or conventional cellular phones coupled to network 506. Third party web servers 502 may provide transaction information about transactions made by each of multiple of such users, for example, from credit cards, debit cards, checking accounts, and the like. Each of the third party web servers 502 provides a user interface to allow multiple users of user computer systems 504 to view information about transactions each has made at retailers who may be independent from the operators of the third party web sites.

System 500 can retrieve, using scripts as described herein, and optionally consolidate, transaction information from one or more third party web servers 502 and may allow for greater analysis than is provided using the tools supplied by the third party web servers 502. All communication with system 500 is made via input output 522 of communication interface 520, which may include a TCP/IP-compatible communication interface running suitable communication protocols, such as Ethernet and TCP/IP.

Input/output 522 is coupled to a network, such as an Ethernet network, the Internet, or both. Users use system 500 via an initial web user interfaces supplied by login manager 546, for example, when the user requests a home page that it supplies.

Users Register and Supply Account Log in Information.

A link on the home page supplied by login manager 546 allows the user to register with system 500 and provide or update user account information that allows a party to log in as the user to third party web servers 502 and retrieve account information.

When the user clicks the link, the user's browser requests a web page supplied by registration manager 532. The page supplied by registration manager 532 it provides in response to the request allows the user to register by selecting a username and password and submitting it to registration manager 532, which registration manager 532 stores into user information storage 534 after checking to see that the username is unique in a conventional fashion.

Once a user is registered, the user may log in to a web page provided by login manager 546 when the user clicks a login link on the home page. Login manager 546 authenticates the user via the information stored in user information storage 546, after which time the user may click a link to registration manager 532 to supply information about one or more accounts for which the user desires transaction information to be retrieved. When the user clicks the link, the user's browser requests a web page supplied by registration manager 532, into which the user may select or specify a name, or address of a web site of, one or more businesses, as well as the account identifier and password at each business that allows the user to retrieve transaction information or other information from that respective business. Registration manager 532 stores into user information storage 534 such information, associated with the user identifier of the user, which it receives either via URL variable passing information with the request for the web page it provides or via a cookie that login manager 546 stores onto the user's computer system 504 with an optionally encrypted version of the user's user identifier that registration manager 532 decrypts. URL variable passing is performed via information provided to the right of the URL for a page.

The System Attempts to Retrieve Transaction or Other Information from Third Party Web Servers.

Periodically, such as nightly, information retrieval manager 536 initiates the retrieval of information from third party web servers 502 for each third party web server specified by each of the users whose information is stored in user information storage 534 as described above. To do so, information retrieval manager 536 selects a first user in user information storage, and for each third party web server 502 specified by that user, provides the account information for the user (e.g. the username and password for the user that allows account information retrieval by that user from that third party web server) and a specification of the third party web server (e.g. a URL) to script/element trial manager 542.

Script/element trial manager 542 uses the specification of the third party web server 502 it receives to identify as described above the script or script elements in script information storage 540 that correspond to the specification of the third party web server it receives and tries to retrieve transaction or other information from the third party web server 502 specified using the user's account information for that third party web server it receives to log in, in the same manner the user would review that user's information on the third party web server 502 by using the script or script elements it identifies. To retrieve a script, script/element trial manager 542 computes the score for each script or element as described above and selects the script or element for the third party web site whose specification it receives as described above and retrieves the script or element with the highest score or scores, though as noted above, recently received scripts or elements with scores other than the highest scores or elements may be occasionally retrieved in order to test the script to determine whether it is better than the script with the highest score.

As it retrieves information from the third party web server 502, script/element trial manager 542 checks to see if the operation of the script or element is successful. As noted above, scripts may be used in their entirety, or script elements may be interchanged from different scripts.

If the operation of the script or element is successful, script/element trial manager 542 records into script information storage 540 an indication of the success associated with the script or element and the date and time and indicates the success to information retrieval manager 536. The information, such as transaction information, retrieved when script/element trial manager 542 operates such script is stored into user information storage 534 associated with the user and the date and time.

If operation of the script or element is unsuccessful, script/element trial manager 542 so indicates to information retrieval manager 536 and records into script information storage 540 an indication of the lack of success associated with the script or element and the date and time, and selects and tries another script for the business or another element for the business that performs the same function or type of function if any are available.

A type of function may be retrieval of information from an transactions page, even though the type of transactions handled by different elements may actually be different (e.g. retrieval of checking account transactions, or retrieval of credit card account transactions) as described above. The selection of each script or element is performed as described above.

In the event that no additional scripts or elements for a function are available for selection as described above by script/element trial manager 542 as it attempts to retrieve information from a third party web server 502, it 542 stores in script information storage 540 an identifier of the third party web server, and in the case of a failed element, the identifier of the type of element on a list of third party web servers for which scripts are needed. In one embodiment, script/element trial manager 542 will place a third party web server on this list if the number of scripts for which a score is computed that exceeds a threshold is less than a threshold number of such scripts, even though no such script or element of such script has ever failed to operate properly as described above. In one embodiment, this threshold number of scripts for a third party web server 502 is a function of how many accounts users have at that web server, and the highest score for scripts for that third party web server 542, with third party web servers with more accounts having a higher threshold than those with fewer accounts, and third party web servers for which scripts exist with a higher high score using a lower threshold than those for which scripts do not exist for that server with as high a score.

After it receives the indication of success or failure of the information retrieval, if the user has specified additional third party web servers from which an attempt at retrieval has not already recently been made, the next third party web server 502 specified by the user is selected by information retrieval manager 536 and the process described above is repeated for that user and web server. Otherwise, information retrieval manager 536 selects a different user for which information retrieval has not recently been attempted and repeats the process described above until information retrieval has been at least attempted for all users specified in user information storage 534. Information retrieval manager 536 may then set a timer in the operating system (not shown) and repeats the process described above when signaled by the timer. In one embodiment, instead of proceeding user by user, information retrieval manager 536 proceeds third party web site by third party web site, processing all users who specified accounts at that web site before proceeding to the next web site.

Users Log in.

At any time, a user may log into system 500 to retrieve transaction information that is retrieved from one or more other web sites as described herein. To log in, the user requests and receives a web page containing a user interface provided by user interface manager 530, which provides user interface elements such as text boxes that allow the user to supply a username and password for that user and press a submit button. When the user does so, the contents of the user interface elements are provided to login manager 544, which authenticates the user against the user identifiers and password for registered users stored in user information storage 534.

If the user is authenticated, log in manager 544 checks the identifiers of third party web servers 502 that the user specified as third party web servers that supply account information for that user, against the list of third party web servers for which an insufficient number of scripts or elements exist that have a score above the threshold for 64 the third party server as described above. Log in manager 544 may generate the list when each user logs in using the scores in script information storage 540. If the user has registered for information retrieval from any third party web servers on the list, log in manager 544 redirects the user to a web page provided by script build manager 548, and otherwise redirects the user to a web page provided by user interface manager 530 that allows the user to view and analyze the information retrieved from accounts of that user on the third party web servers 520 and stored in user information storage 534 using the scripts or elements built as described herein.

When a page is requested from script build manager 548, script build manager 548 identifies the third party web servers for which an insufficient number of scripts or elements exist that have a score above the threshold as described above and builds and provides to the user computer system 504 a web page that asks the user if the user would be willing to demonstrate operation of the web sites on any of the third party web servers 502 it identified for the user as described above and allows the user to click a link corresponding to any of them (such link identifying the name of the businesses or the web site to which each link corresponds) or to click a link declining such demonstration. As used herein, buttons and links may be used interchangeably.

If the user clicks the link declining the demonstration, the user's browser will request a web page provided by user interface manager 530 that allows a user to view and analyze the information retrieved from third party web servers 502 on behalf of that user in a conventional fashion. If the user clicks one of the links corresponding to one of the third party web servers 502, the user's browser will request a web page provided by page instrumentation manager 552. The link includes URL variable passing information identifying business of the third party web server 502.

When it receives the request for the web page and the URL, page instrumentation manager 552 downloads a program to the user's browser that will request the URL from one of the third party web servers 502 and instruments the web page as described above and herein. In another embodiment, page instrumentation manager 552 requests the web pages, instruments them and provides them to the user as described herein instead of downloading to the user's browser a program to do so.

Instrumentation of Web Pages and Receipt of Field Location Information.

Figure 6:
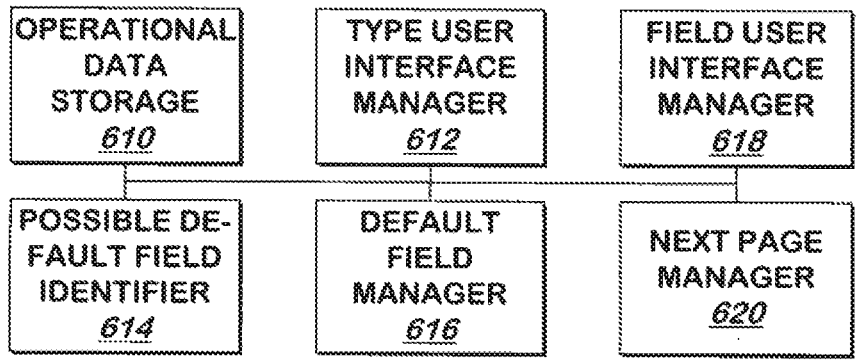
FIG. 6 is a block schematic diagram of a plug in or program downloaded to a browser to allow a user to identify field locations according to one embodiment of the present invention.

The instrumentation or proxy may include modification of the data on the web page as well as the elements illustrated in FIG. 6. Such instrumentation may be implemented as a plug in to the user's browser, as a Java or Javascript program or both. Referring now to FIGS. 5 and 6, modification of the web page may include modification of the web page links and submit buttons to refer to field user interface manager 618, though in one embodiment, no such modification is needed if the user's browser can be configured to report an identifier of link selections and button presses to field user interface manager 618.

In one embodiment, modification of the web page includes framing it into a large frame and two smaller frames. The smaller frames are used to display user interfaces operated by type user interface manager 612 (across the top of the browser window in one embodiment) and field user interface manager 618 (along the right side of the browser window in one embodiment), though other arrangements may be used. The identifier of the business whose web pages are having their operation demonstrated by the user is supplied to field user interface manager 618 by page instrumentation manager 552.

Type user interface manager 612 then requests the user to enter the URL to reach the third party web server 502 of the business selected if the displayed page is incorrect or was not supplied.

In one embodiment, when the user enters a URL, the browser will supply the URL to type user interface manager 612, which requests a web page from page instrumentation manager 552 with the URL provided by the user as URL variable information. URL variable information may be information that follows a slash to the right of the URL used to request the page from page instrumentation manager 552. In the embodiments in which type user interface manager 612 or field user interface manager 618 or default field manager 616 instruments the page, the entity instrumenting the page may receive the URL and request the page from the third party web server 502 corresponding to the URL variable information received from the user.

Page instrumentation manager 552 (or type user interface manager 612 or field user interface manager 618 or default field manager 616) requests the page and places it into the large frame and instruments it as described herein. In one embodiment, instrumentation of the page includes adding-java or javascript code to operate as described herein, for example to highlight locations of certain potential fields as the user hovers over them, in one embodiment, in response to a variable that is set by field user interface manager 618 that indicates the current field whose location the user is about to identify.

Type user interface manager 612 displays in the frame described herein the different types of pages that could be encountered on a web site that provides transaction information such as a bank or credit card web site, and allows the user to select one of them at a time to indicate the type of web page to which the user has navigated. It is noted that if a script element is being defined, the type may be preselected by page instrumentation manager supplying the type as part of the information it provides, and type user interface manager 612 may read the type and operate as if the user had selected that type. When the user selects a type, type user interface manager 612 provides an identifier of the selected type (or provides the preselected type) to field user interface manager 618, which displays the types of fields which can be operated or retrieved when using the type of page it receives. Each of type user interface manager 612 and field user interface manager 618 internally stores the information each requires to operate as described herein.

When the user selects a field whose location the user will identify, field user interface manager 618 sets a variable to cause the page instrumented by page instrumentation manager 552 or the other entities that instrument the page to outline or otherwise highlight the field locations as the user moves the mouse cursor over them. In one embodiment, type user interface manager 612 may instrument the page to perform this operation in addition to page instrumentation manager 552, removing any previous instrumentation it added for selection of field locations other fields and adding or retaining instrumentation to allow the field locations already identified to remain highlighted as described herein. In such embodiment, each time the field name is selected, field user interface manager 618 instruments the page to outline or otherwise highlight the potential field locations as described herein and so no variable that causes them to be highlighted is set by field user interface manager 618.

The entity 552, 618, 612 that instruments the page to highlight the locations, instruments it to additionally cause selection of a field location by the user to communicate the identifier of the location of the field and the identifier of the field to field user interface manager 618.

Field user interface manager 618 allows the user to select different fields and the locations of the fields and includes a user interface control such as a button for the user to indicate the user is finished identifying field locations for the type of page most recently selected as described above. When the user uses the user interface control to indicate the user is finished, field user interface manager 618 provides the identifier of the field location and the identifier of the field for each field supplied as described above, to script build manager 548, along with the type of page and identifier of the business it received.

To allow a user to move to the next page in a sequence of pages on the web site whose operation is being demonstrated, in one embodiment, field user interface manager 618 will operate a button, link or other user interface control the user identified as a submit or a link as described herein. If no such button, link or other user interface control is specified, the user may enter a URL into an address bar of the browser, and the URL will be recorded by field user interface manager 618. In either event, the URL entered or the one corresponding to the control is provided by field user interface manager 618 to page instrumentation manager 552, either directly or via type user interface manager 612, which provides the values of the user interface controls that have been altered by the user in the user interface it provides as described above. When page instrumentation manager 552 obtains and instruments the page corresponding to the one requested, page instrumentation manager 552 provides the values to type user interface manager 612, which displays their previous values. The values may indicate the types of pages already completed by the user to allow the user to keep track of the user's location in the series of pages whose operation the user is demonstrating as described herein.

Identification of Default Fields.

In one embodiment, default field locations may be identified as described above and herein. In this embodiment, possible default field identifier 614 receives the page type from type user interface manager 612 when the user selects a page type and scans the page for potential default field locations for each field as described above and assigns them scores as described above. All information it uses other than the information on the page is provided as part of possible default field identifier 614 by page instrumentation manager 552, which may include any of the information used to repair a script or identify possible default field locations, such as information identified as described herein by script/element repair manager 554. The page type, location identifier, field name, and score for each potential default field are provided by possible default field identifier 614 to default field manager 616.

Default field manager 616 identifies those potential default fields that meet a set of rules as described herein, such as those having the highest score for a field and having a score that is higher than the next potential default field by a first threshold amount for the same field, and also determines if the score is above a second threshold. Any potential default fields that meet both criteria are designated by default field manager 616 as default field locations that do not need confirmation, and those meeting only the first criteria are designated by default field manager 616 as a default field location that require confirmation. The field name, location identifier and designation are provided by default field manager 616 to field user interface manager 618 and, if another element instruments the page, to that element (it is noted that possible default field identifier 614 and default field manager 616 may be a component of page instrumentation manager 552). The element instrumenting the page instruments it for operation as described above, either by causing it to be initially highlighted or by not instrumenting for that field at all (if the location is designated as not requiring confirmation). Field user interface manager 618 may use the same user interface or may add an additional element such as a button to allow confirmation of the default field location (if a default field was identified for the field and designated as requiring confirmation) and may not provide any user interface for confirmation or selection of the location of the field for fields for which a default field location was identified and designated as not requiring confirmation.

In the event that it identifies default field locations for all fields on a page, and all of them are designated as not requiring confirmation, in one embodiment, field user interface manager 618 provides the field names, field location identifiers, page type and business identifier to script build manager 548 as described above, including those identified and designated as not requiring confirmation, those confirmed or changed by the user and those located by the user without any default field location, optionally without providing the user interface that allows confirmation of the field locations or selection of different field locations for those identified as not requiring confirmation.

In one embodiment, so as to provide more consistent user interface, in the case of the above operation, field user interface manager 618 provides an explanation to the user that the field locations have been identified with confidence and so no demonstration of the operation of the current page is required. Field user interface manager 618 then either operates the submit button or link that was identified by default field manager 616 that selects the next page in the sequence (for pages other than the last page in the sequence), or allows the user to select a link on the page to use for that purpose or to enter a URL to identify the next page in the sequence.

Selection of the Next Page in the Sequence.

The entity that instruments the page may instrument some or all of the links or buttons to request a web page from page instrumentation manager 552 that has the original URL corresponding to the button or link included as URL variable passing information. If the user types a URL into the web browser address bar and indicates to the browser that the URL should be used to request a page in a conventional manner, next page manager 620 receives the URL and requests a page from page instrumentation manager 552 with the URL entered by the user as URL variable passing information for the requested page.

Page instrumentation manager requests the page it receives as URL variable passing information and then either instruments the page and returns it to the browser with the elements of FIG. 6 embedded in it, for example, as computer source code, or embeds the elements of FIG. 6 into it and returns it uninstrumented to the browser, and one or more of the elements of FIG. 6 instruments the page as described above and herein.

20 Building of Scripts or Script Elements.

When script build manager 548 receives the identifier of the business, type of page, and field name and location identifier for each field as described above, script build manager builds such information into a script element for the type of page and business identifier and stores it into script information storage 540, with the date, time and user identifier which may also be provided by field user interface manager 618 which it retrieves from a cookie or receives from page instrumentation manager 552 at the time it is added to the page. Even though the user may define an entire script consisting of multiple script elements, script build manager 548 may logically separate the script elements when it stores them, or script build manager 548 may store them all as a single script.

A script may consist of the business name, page type, field names for that page type and field locations for the at least the required field names received and any optional field names received. Such information may be used by information retrieval manager 536 to operate the page, for example by providing information such as a username and password into the locations on a retrieved page corresponding to two such fields and pressing a submit button at the location of a third field. The location of fields on other pages may be used to select links to retrieve information from an account or to retrieve transaction information or other information from the third party web site of the business whose information is being retrieved. Other functions may be performed using a script or any of its elements.

In one embodiment, a script element is stored for each page of the web site that is used for the ultimate purpose of information retrieval. As noted, a script may be a set of one or more elements received. Scripts may be stored as elements, and either elements from the same user and a storage date and time that are near one another (indicating the script elements were supplied as part of the same session) are used to operate a web site, or script elements from different users or from different sessions of the same user are used to operate a web site.

Testing of Scripts to Address Potential HTTPS Issues.

In one embodiment, each script element is assigned a unique identifier by script build manager 548 and the unique identifier is stored in script information storage 540 along with the other information for the script element. In one embodiment, when script build manager 548 stores a script element, it provides script/element trial manager 542 with the identifier of the script element and the identifier of the user.

When it receives the identifier of the script element, script/element trial manager 542 retrieves the script element from script information storage 540. Script/element trial manager 542 checks the operation of the script element as described above. If script/element trial manager 542 determines the operation of the script is successful, script/element trial manager 542 provides to page instrumentation manager 552 the user identifier it received, and the type of page and name of the business stored with the script element corresponding to the identifier it received, and an indication that operation of the element corresponding to the type of page was successful.

If it receives an indication that operation of the script element corresponding to the type of page was successful, when page instrumentation manager 552 instruments the next page, it will indicate that demonstration of the operation of that type of page is complete, for example, by so indicating to type user interface manager 612 that it may provide with each page.

If script/element trial manager 542 determines the operation of the script is not successful, script/element trial manager 542 provides to page instrumentation manager 552 the user identifier it received, and the type of page and name of the business stored with the script element corresponding to the identifier it received, and an indication that operation of the element corresponding to the type of page was not successful. When page instrumentation manager 552 instruments the page, it will instrument all subsequent for that web site to the same user or all users pages differently, as will now be described. The page that was not operated successfully will be instrumented as described below and its demonstration reperformed using the newly instrumented page.

In one embodiment, scripts are first instrumented to cause operation of links or buttons or other user interface controls to generate a get or post request to cause variables that indicate the fields and locations indicated by the user to be supplied to script build manager 548 and to indicate the link or button pressed and the original URL corresponding to that button or link. Page instrumentation manager 552 may also instrument the page as described above to allow it to highlight field locations as the user moves the mouse over the page as described above. Thus, when the user identifies the button or link or other user interface control to select the next page in the sequence of pages, script build manager 548 will receive such information, use it to build the script element for that page, and provide the URL to information retrieval manager 536 to request the next page as described above. If operation of the script is not successful, in one embodiment, page instrumentation manager 552 supplies a different version of type user interface manager 612. The different version of type user interface manager 612 operates as described above, but also instruments the pages itself. The links, buttons and other similar user interface elements are not changed, but they may be instrumented to report their clicks and identify themselves to field user interface manager 618, which records them and provides the fields and field locations (identified as DOM identifiers) to script build manager 548 when the user clicks a link or button or other similar user interface element.

In one embodiment, type user interface manager 612 initially disables operation of all links, buttons and other similar user interface elements. Field user interface manager 618 reenables their operation and instruments them as described above when the user indicates the field corresponding to a link, button or other similar user interface element (e.g. a javascript area). In one embodiment, such reenabling and instrumentation will only occur after the other required fields for a page have been selected and their locations identified as described herein.

Script Repair.

In one embodiment, when a script or element that was once working does not operate properly, the system of FIG. 5 will attempt to repair the script as described above. In such embodiment, at least once when a script or element operates successfully, names of fields, labels of fields or both are stored in script information storage 540 associated with the script or element by script/element trial manager 542 as described above. In such embodiment, if operation of the script or element is unsuccessful, script/element trial manager 542 provides an identifier of the script or element to script/element repair manager 554. Script/element repair manager 554 may attempt to repair the script and identify a confidence score for the repair as described above using the information from the web page or web pages corresponding to the script and the stored name, labels and other information for the script as described above. In one embodiment, if the confidence score exceeds a threshold, script/element repair manager 554 replaces in script information storage 540 the script or element repaired with the repaired version, and sets the score for the script or element equal to a value above the threshold that would cause it to be considered not successfully operated. Otherwise, does not replace the script or element and the user will be requested to demonstrate operation as described above.

In one embodiment, when initially stored, the replacement script or element is marked by script/element repair manager 554 to indicate it should be manually checked for successful operation by a user as described above and stored with the date and time of repair. Script/element trial manager 542 will not make use of such marked scripts for information retrieval as described above. In such embodiment, when a user logs in to login manager 544, login manager 544 checks such marked scripts or elements for correspondence with the web sites or business names from which the user has arranged information retrieval.

If one or more such marked script or element is stored in script information storage 540, login manager 544 may ask the user if the user would test operation of the script or element and if the user agrees, provides an identifier of the script or element to script/element repair manager 554. Script/element repair manager 554 attempts to retrieve information from the corresponding web site using the script or a script employing the element as described above.

Elements that replace elements that may not work properly for all users, for example, those that retrieve information from a type of account the user doesn't have. In one embodiment, a script element may be stored associated with a type that indicates the element as a type of element that not all users have. In one embodiment, each time such an element is successfully operated on behalf of a user, the user name and script element identifier is stored by script/element trial manager 542 with the date and time and username of the user. If such a script element is replaced, the correspondence check performed by login manager 544 for such a marked script will only succeed for that type of element if the element replaced had previously operated successfully for that same user within a threshold amount of time, such as a week or a month or the time it would have been used before it did not operate successfully.

In one embodiment, script/element repair manager 554 displays to the user the information retrieved using the script or element repaired and asks the user if the information appears correct. In another embodiment, script/element repair manager 554 reaches the point in the script that had previously not operated successfully and displays the entire web page retrieved (containing fields believed not to be working) to the user, indicates the locations of the fields in the same manner as default field locations are indicated as described above, asks the user to confirm or change them in the same manner as described above, or indicate that the page does not contain the field or fields sought, and receives the confirmation or changes or indication. If changes are received, script/element repair manager 554 modifies and stores the script or element accordingly in the manner described above, using the same type as was stored with the script element no longer successfully operating.

If the user confirms or changes field locations, the mark added as described above is removed by script/element repair manager 554. If the user indicates any fields are not on the page or otherwise indicates the repair cannot be made using the available information, the user may be asked by script/element repair manager 554 if they would like to demonstrate operation of the web site and the user responds affirmatively, the identifier of the business name or URL of the web site and optionally the type of the element whose repair had been attempted is provided to script build manager 548, which allows the user to build the script or element as described above. If an element repair was attempted, the type and other script elements may be used to bring the user to the point of the element whose repair had been attempted, so that the user does not have to demonstrate operation of the web site corresponding to elements whose operation had been successful or elements before the element whose repair was attempted.

What is claimed is:

1. A method of building at least a portion of a script that retrieves information from a website, the method comprising:
    receiving, at a computing system via a network, a request from a user to retrieve information from the website;
    determining, via the computing system, that no satisfactory script for retrieving the requested information from the website exists in a database;
    receiving, at the computing system via the network, an indication of a page type for a first web page of the website from the user;
    retrieving, via the network, the first web page via a network;
    identifying, via the computing system, a candidate script element previously defined for the page type based on a second web page;
    determining, via the computing system, a candidate similarity score that measures a similarity between a part of the first web page and a part of a second web page, wherein the candidate script element is configured to perform a function on the part of the second web page;
    determining the candidate similarity score meets a predefined threshold; and
    performing, via the candidate script element, the function on the part of the first web page based on the determination that the candidate similarity score meets the predefined threshold.

2. The method of claim 1, wherein performing the function includes logging in to the website, navigating to a third page where the requested information is located, or retrieving the information from the website.

3. The method of claim 1, wherein determining that no satisfactory script exists for retrieving the requested information from the website in the database includes determining that a success score for a script in the database does not meet a threshold success score.

4. The method of claim 1, wherein determining the candidate similarity score includes:
    determining that a text phrase on the first page matches a text phrase on the second page; and
    adding a first amount to the candidate similarity score based on the determination that the text phrase of the first page matches the text phrase on the second page.

5. The method of claim 4, wherein determining the candidate similarity score further includes:
    determining that an individual word on the first page matches an individual word on the second page; and
    adding a second amount to the candidate similarity score based on the determination that the individual word on the first page matches the individual word on the second page, wherein the second amount is less than the first amount.

6. The method of claim 5, wherein determining the candidate similarity score further includes:
    determining that an additional word on the second page is a synonym of an additional word on the second page; and
    adding a third amount to the candidate similarity score based on the determination that the additional word on the second page is a synonym of the additional word on the second page.

7. The method of claim 4, wherein the text phrase on the first page is located in a header of the first page or a title of the first page.

8. The method of claim 1, further comprising:
    identifying, via the computing system, an alternative script element previously defined for the page type based on a third web page;
    determining, via the computing system, an alternative similarity score that measures a similarity between the part of the first web page and a part of a third web page, wherein the alternative script element is configured to perform the function on the part of the third web page;
    determining, via the computing system, that the candidate similarity score exceeds the alternative similarity score; and
    adding the candidate script element instead of the alternative script element to a script for retrieving the requested information based on the determination that the candidate similarity score exceeds the alternative similarity score.

9. A system comprising:
    one or more processors; and
    memory storing one or more applications that, when executed on the one or more processors, perform an operation comprising:
        receiving, at a computing system via a network, a request from a user to retrieve information from the website;

determining, via the computing system, that no satisfactory script for retrieving the requested information from the website exists in a database;

receiving, at the computing system via the network, an indication of a page type for a first web page of the website from the user;

retrieving, via the network, the first web page via a network;

identifying, via the computing system, a candidate script element previously defined for the page type based on a second web page;

determining, via the computing system, a candidate similarity score that measures a similarity between a part of the first web page and a part of a second web page, wherein the candidate script element is configured to perform a function on the part of the second web page;

determining the candidate similarity score meets a predefined threshold; and performing, via the candidate script element, the function on the part of the first web page based on the determination that the candidate similarity score meets the predefined threshold.

10. The system of claim 9, wherein performing the function includes logging in to the website, navigating to a third page where the requested information is located, or retrieving the information from the website.

11. The system of claim 9, wherein determining that no satisfactory script exists for retrieving the requested information from the website in the database includes determining that a success score for a script in the database does not meet a threshold success score.

12. The system of claim 9, wherein determining the candidate similarity score includes:

determining that a text phrase on the first page matches a text phrase on the second page; and adding a first amount to the candidate similarity score based on the determination that the text phrase of the first page matches the text phrase on the second page.

13. The system of claim 12, wherein determining the candidate similarity score further includes:

determining that an individual word on the first page matches an individual word on the second page; and adding a second amount to the candidate similarity score based on the determination that the individual word on the first page matches the individual word on the second page, wherein the second amount is less than the first amount.

14. The system of claim 13, wherein determining the candidate similarity score further includes:

determining that an additional word on the second page is a synonym of an additional word on the second page; and adding a third amount to the candidate similarity score based on the determination that the additional word on the second page is a synonym of the additional word on the second page.

15. The system of claim 12, wherein the text phrase on the first page is located in a header of the first page or a title of the first page.

16. The system of claim 9, further comprising:

identifying, via the computing system, an alternative script element previously defined for the page type based on a third web page;

determining, via the computing system, an alternative similarity score that measures a similarity between the part of the first web page and a part of a third web page, wherein the alternative script element is configured to perform the function on the part of the third web page;

determining, via the computing system, that the candidate similarity score exceeds the alternative similarity score; and adding the candidate script element instead of the alternative script element to a script for retrieving the requested information based on the determination that the candidate similarity score exceeds the alternative similarity score.

17. A non-transitory computer-readable storage medium containing instructions that, when executed by one or more processors, perform an operation comprising:

receiving, at a computing system via a network, a request from a user to retrieve information from the website;

determining, via the computing system, that no satisfactory script for retrieving the requested information from the website exists in a database;

receiving, at the computing system via the network, an indication of a page type for a first web page of the website from the user;

retrieving, via the network, the first web page via a network;

identifying, via the computing system, a candidate script element previously defined for the page type based on a second web page;

determining, via the computing system, a candidate similarity score that measures a similarity between a part of the first web page and a part of a second web page, wherein the candidate script element is configured to perform a function on the part of the second web page;

determining the candidate similarity score meets a predefined threshold; and performing, via the candidate script element, the function on the part of the first web page based on the determination that the candidate similarity score meets the predefined threshold.

18. The non-transitory computer-readable storage medium of claim 17, wherein performing the function includes logging in to the website, navigating to a third page where the requested information is located, or retrieving the information from the website.

19. The non-transitory computer-readable storage medium of claim 17, wherein determining the candidate similarity score includes:

determining that a text phrase on the first page matches a text phrase on the second page; and adding a first amount to the candidate similarity score based on the determination that the text phrase of the first page matches the text phrase on the second page.

20. The non-transitory computer-readable storage medium of claim 17, further comprising:

identifying, via the computing system, an alternative script element previously defined for the page type based on a third web page;

determining, via the computing system, an alternative similarity score that measures a similarity between the part of the first web page and a part of a third web page, wherein the alternative script element is configured to perform the function on the part of the third web page;

determining, via the computing system, that the candidate similarity score exceeds the alternative similarity score; and adding the candidate script element instead of the alternative script element to a script for retrieving the requested information based on the determination that the candidate similarity score exceeds the alternative similarity score.

\* \* \* \* \*